(12) United States Patent
Lee et al.

(10) Patent No.: US 11,595,858 B2
(45) Date of Patent: Feb. 28, 2023

(54) METHOD AND APPARATUS FOR PERFORMING RESOURCE RESERVATION IN NR V2X

(71) Applicant: LG ELECTRONICS INC., Seoul (KR)

(72) Inventors: Jongyoul Lee, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 17/252,725

(22) PCT Filed: Aug. 6, 2019

(86) PCT No.: PCT/KR2019/009809
§ 371 (c)(1),
(2) Date: Dec. 15, 2020

(87) PCT Pub. No.: WO2020/032546
PCT Pub. Date: Feb. 13, 2020

(65) Prior Publication Data
US 2021/0219187 A1 Jul. 15, 2021

Related U.S. Application Data

(60) Provisional application No. 62/716,343, filed on Aug. 8, 2018.

(51) Int. Cl.
*H04W 72/04* (2009.01)
*H04W 28/26* (2009.01)
(Continued)

(52) U.S. Cl.
CPC .......... *H04W 28/26* (2013.01); *H04B 17/382* (2015.01); *H04L 5/0035* (2013.01);
(Continued)

(58) Field of Classification Search
CPC .... H04W 72/04; H04W 28/26; H04B 17/382; H04L 5/0035; H04L 47/70; H04L 47/76
See application file for complete search history.

(56) References Cited

U.S. PATENT DOCUMENTS

2019/0306923 A1* 10/2019 Xiong ................. H04L 27/261
2019/0349904 A1* 11/2019 Kwak .................. H04L 5/0048
(Continued)

FOREIGN PATENT DOCUMENTS

| WO | 2017150955 | 9/2017 |
| WO | 2017176099 | 10/2017 |
| WO | 2018124776 | 7/2018 |

OTHER PUBLICATIONS

R1-1712491,"Sharing Resource Pool for eNB-Controlled and UE-Autonomous V2V Transmission Modes", Aug. 21-25, 2017, pp. 1-5 (Year: 2017).*
(Continued)

Primary Examiner — Salvador E Rivas
(74) Attorney, Agent, or Firm — Lee, Hong, Degerman, Kang & Waimey PC

(57) ABSTRACT

A method by which a first device (100) performs sidelink transmission and an apparatus for supporting same are presented. The method comprises the steps of: receiving information about a first resource pool set on the basis of a first slot format; reserving a first resource for the sidelink transmission on the basis of the information about the first resource pool; receiving information about a second resource pool set on the basis of a second slot format, after reserving the first resource; and performing the sidelink transmission on the basis of the information about the second resource pool.

12 Claims, 28 Drawing Sheets

(51) Int. Cl.
  *H04W 72/0446*  (2023.01)
  *H04B 17/382*  (2015.01)
  *H04L 5/00*  (2006.01)
  *H04W 92/18*  (2009.01)
  *H04L 47/76*  (2022.01)

(52) U.S. Cl.
  CPC ....... *H04W 72/04* (2013.01); *H04W 72/0446* (2013.01); *H04L 47/76* (2013.01); *H04W 92/18* (2013.01)

(56) References Cited

U.S. PATENT DOCUMENTS

2019/0394786 A1* 12/2019 Parron ................ H04L 27/0006
2021/0352623 A1* 11/2021 Wang ................ H04W 72/0446

OTHER PUBLICATIONS

PCT International Application No. PCT/KR2019/009809, International Search Report dated Nov. 21, 2019, 4 pages.
Intel, "On Sidelink Resource Pool Sharing for eNB-Controlled and UE-Autonomous V2V Transmission Modes", 3GPP TSG RAN WG1 Meeting #93, R1-1806484, May 2018, 6 pages.
Oppo, "Remaining issues on multi-slot resource allocation", 3GPP TSG RAN WG1 Meeting #93, R1-1806867, May 2018, 4 pages.

* cited by examiner (a)

(b)

(a)

(b)

METHOD AND APPARATUS FOR PERFORMING RESOURCE RESERVATION IN NR V2X

CROSS-REFERENCE TO RELATED APPLICATIONS

This application is the National Stage filing under 35 U.S.C. 371 of International Application No. PCT/KR2019/009809, filed on Aug. 6, 2019, which claims the benefit of U.S. Provisional Application No. 62/716,343, filed on Aug. 8, 2018, the contents of which are all incorporated by reference herein in their entirety.

BACKGROUND OF THE DISCLOSURE

Field of the Disclosure

The present disclosure is related to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirement areas of 5G include (1) enhanced mobile broadband (eMBB) domain, (2) massive machine type communication (mMTC) area, and (3) ultra-reliable and low latency communications (URLLC) area. Some usage cases may require multiple areas for optimization and, other usage cases may only focus on only one key performance indicator (KPI). 5G is to support these various usage cases in a flexible and reliable way.

eMBB focuses on across-the-board enhancements to the data rate, latency, user density, capacity and coverage of mobile broadband access. The eMBB aims approximately 10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special usage case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another usage case is augmented reality and information retrieval for entertainment. Here, augmented reality requires very low latency and instantaneous data amount.

mMTC is designed to enable communication between devices that are low-cost, massive in number and battery-driven, intended to support applications, such as smart metering, logistics, and field and body sensors. mMTC aims approximately 10 years on battery and/or approximately 1 million devices/$km^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims approximately 1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of usage cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many usage cases for mobile communications to vehicles. For example, entertainment for passengers demands high capacity and high mobile broadband at the same time. This is because future users will continue to expect high-quality connections regardless of their location and speed. Another usage case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters, such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important usage cases of mobile communications that enable tracking of inventory and packages anywhere using location-based information systems. Usage cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in case a flexible slot configuration of an NR system is applied to NR V2X, a problem may occur in the aspect of resource allocation (or assignment). Additionally, in case a flexible slot configuration of an NR system is applied to NR V2X, signaling for partial coverage communication or inter-cell communication may be required.

Technical Solutions

According to an embodiment, provided herein is a method for performing sidelink transmission, by a first device (100). The method may include the steps of receiving information on a first resource pool being configured based on a first slot format, reserving a first resource for the sidelink transmission based on information on the first resource pool, after receiving the first resource, receiving information on a second resource pool being configured based on a second slot format, and performing the sidelink transmission based on the information on the second resource pool.

According to another embodiment, provided herein is a first device (100) performing sidelink transmission. Herein, the first device (100) may include one or more memories, one or more transceivers, and one or more processors being operatively connected to the one or more memories and the one or more transceivers, wherein the one or more processors is configured to control the transceiver to receive information on a first resource pool being configured based on a first slot format, to reserve a first resource for the sidelink transmission based on information on the first resource pool, after receiving the first resource, to receive information on a second resource pool being configured based on a second slot format, and to perform the sidelink transmission based on the information on the second resource pool.

Effects of the Disclosure

A user equipment (UE) may efficiently perform sidelink transmission.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
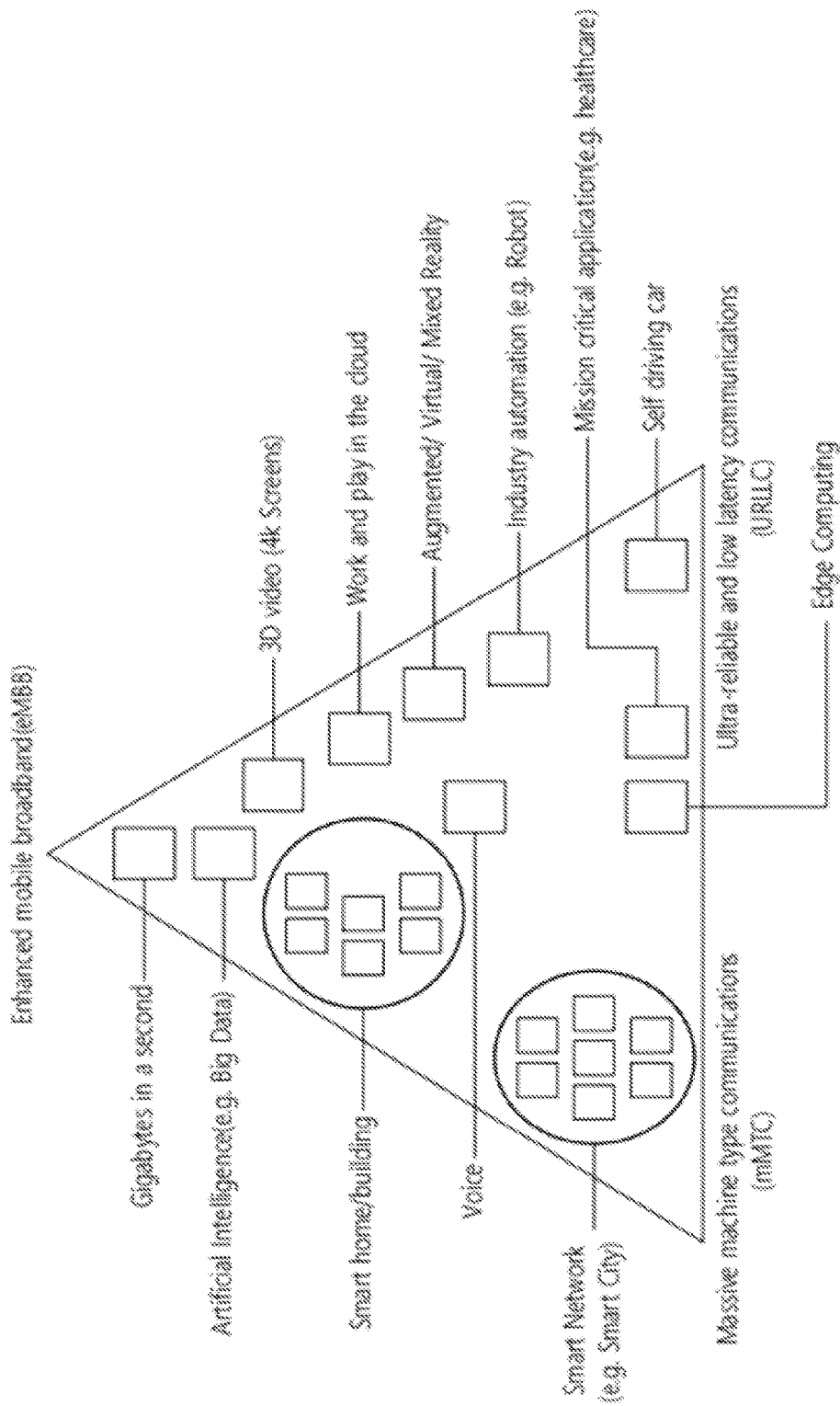
FIG. 1 shows examples of 5G usage scenarios to which the technical features of the present disclosure can be applied.
Figure 2:
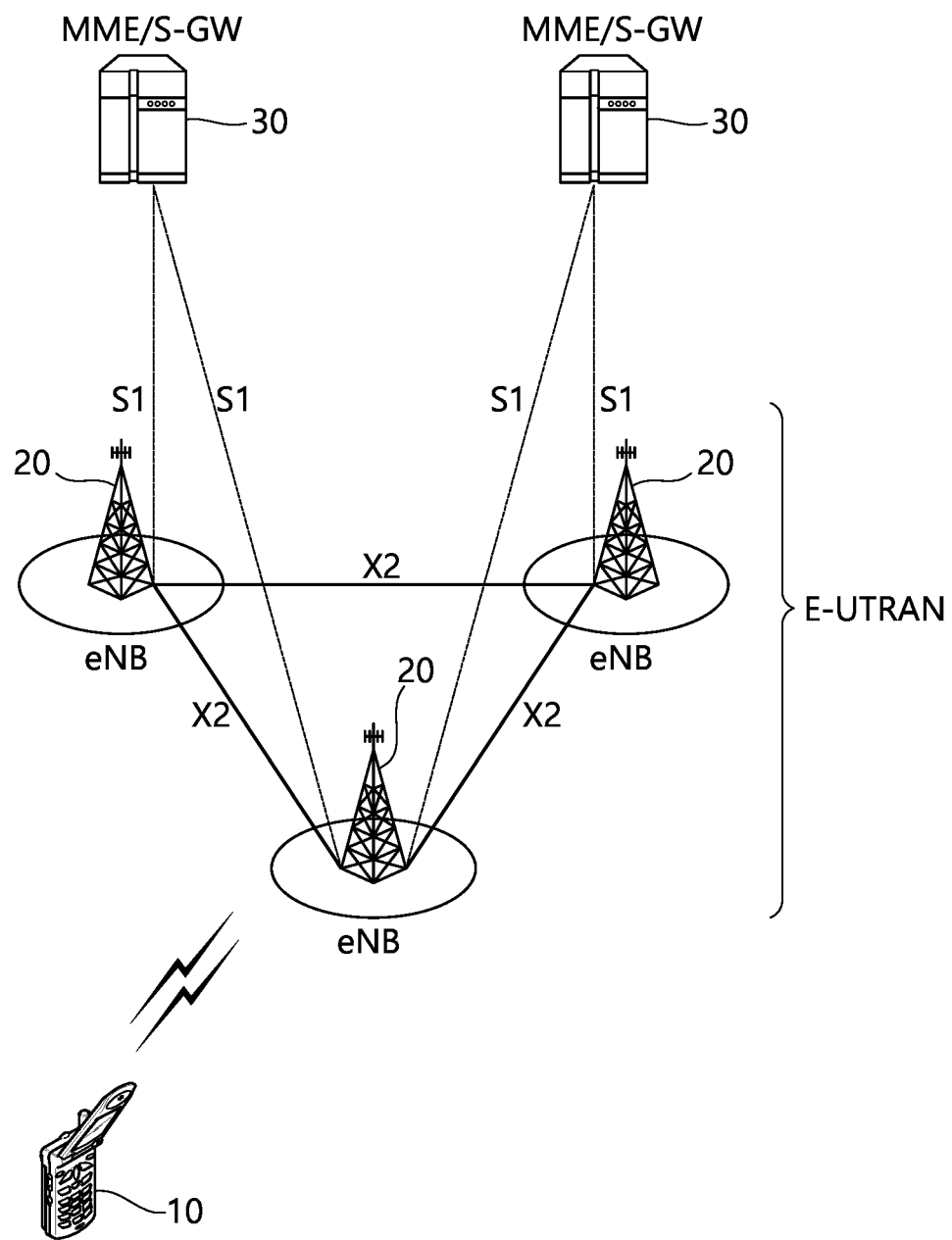
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base stations (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
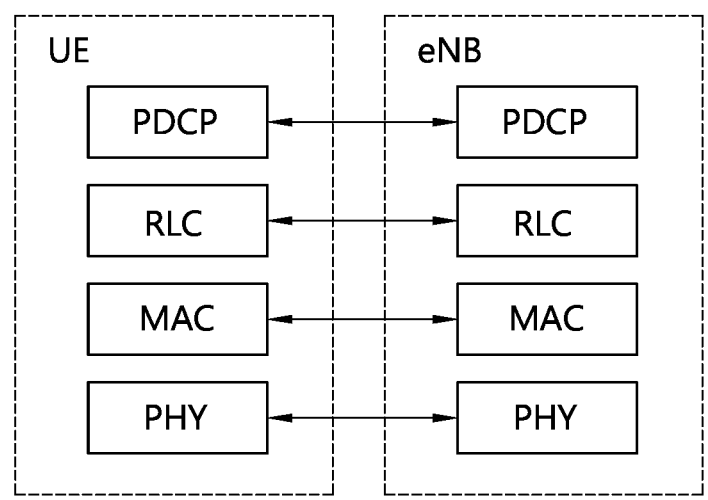
FIG. 3 shows a radio protocol architecture of a user plane to which an exemplary embodiment of the present disclosure can be applied.
Figure 4:
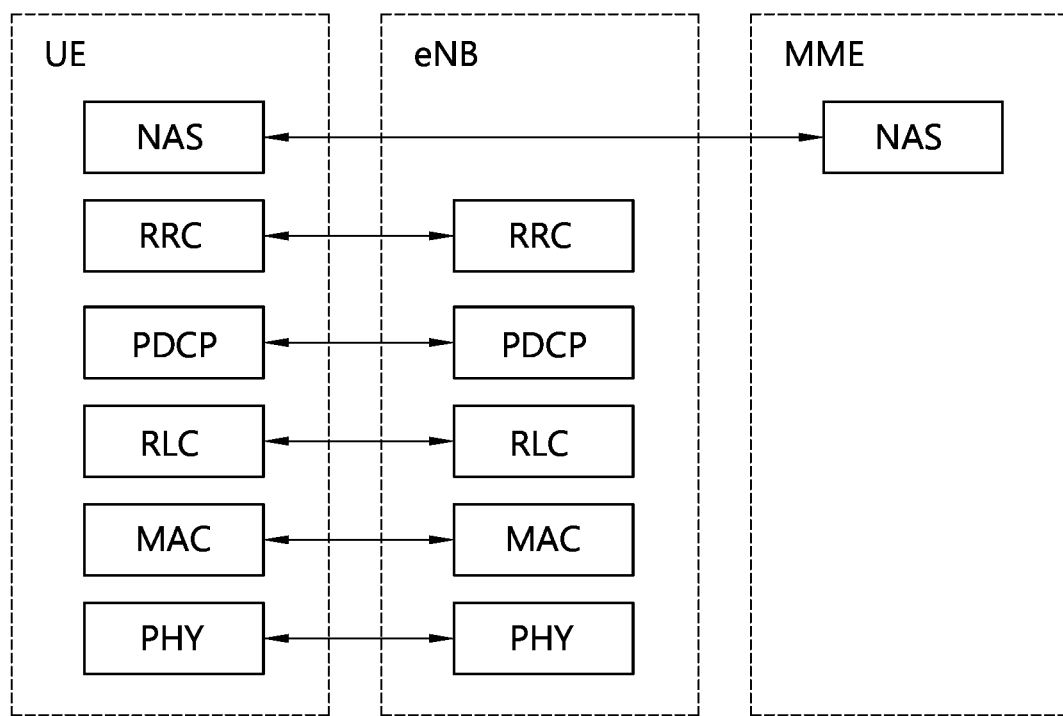
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a high layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a high layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of subcarriers in the frequency domain. One subframe is configured of a plurality of OFDM symbols in the time domain. A resource block is configured of a plurality of OFDM symbols and a plurality of subcarriers in resource allocation units. Additionally, each subframe may use specific subcarriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
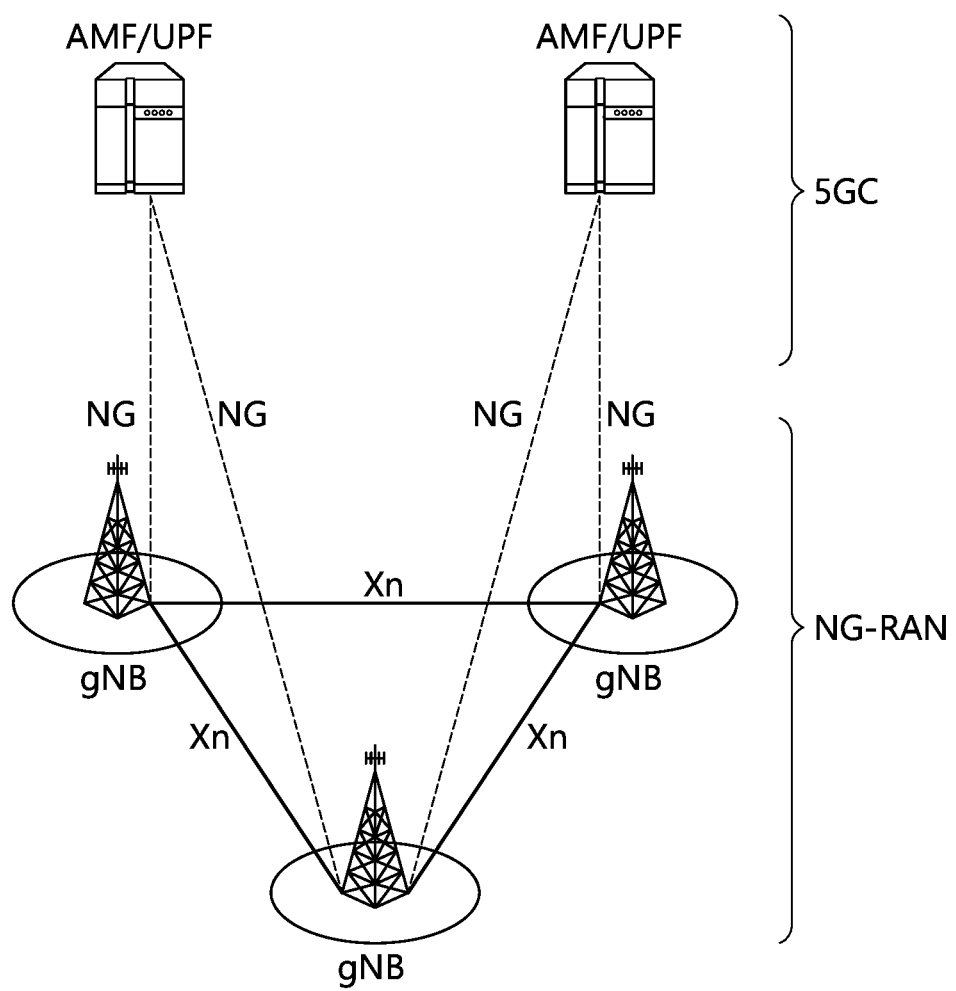
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
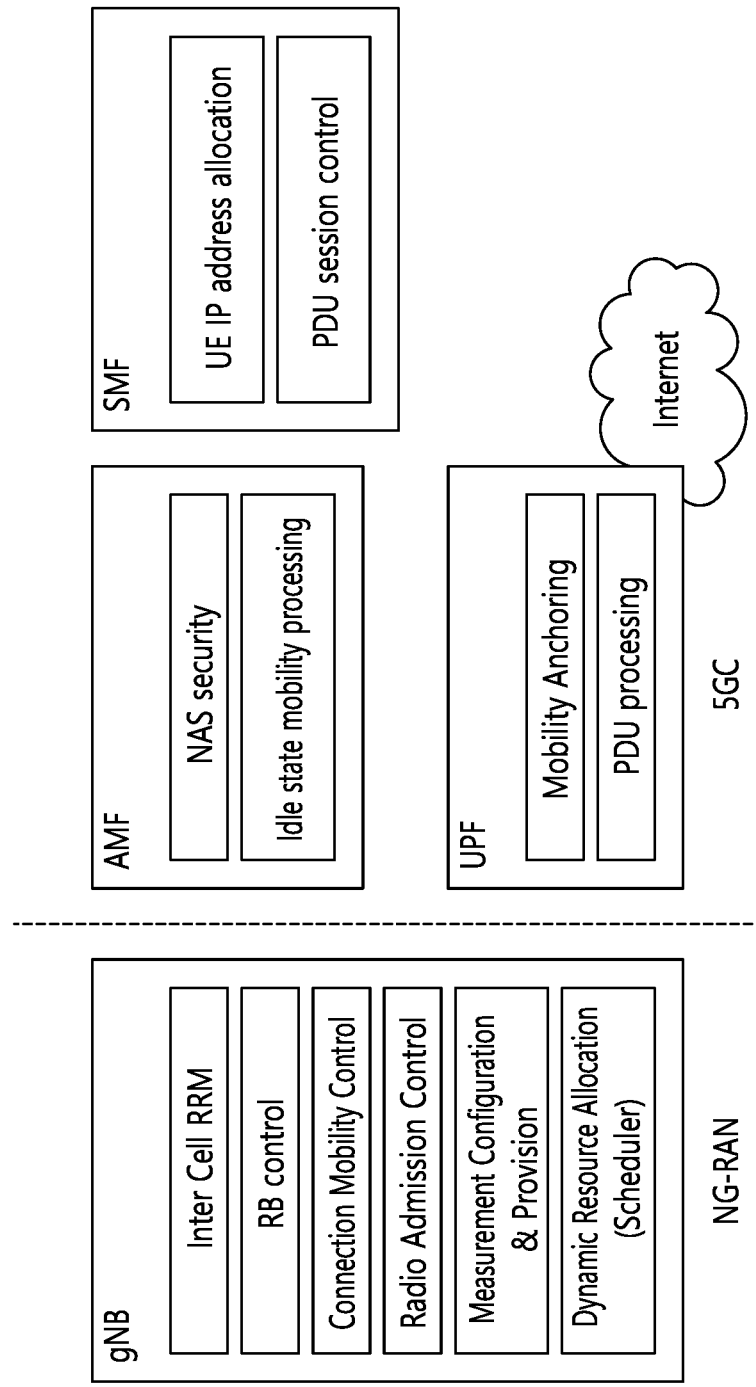
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
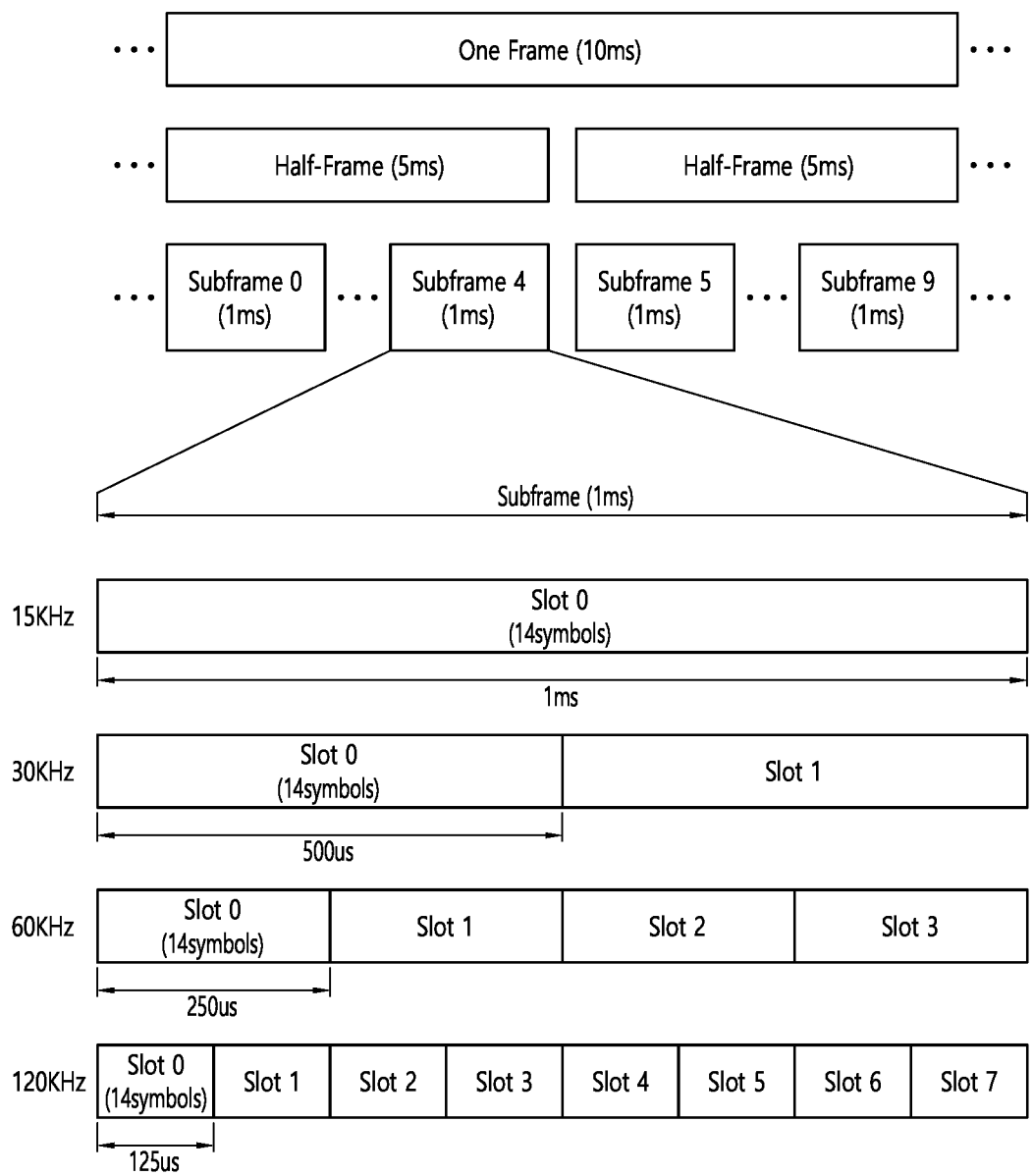
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
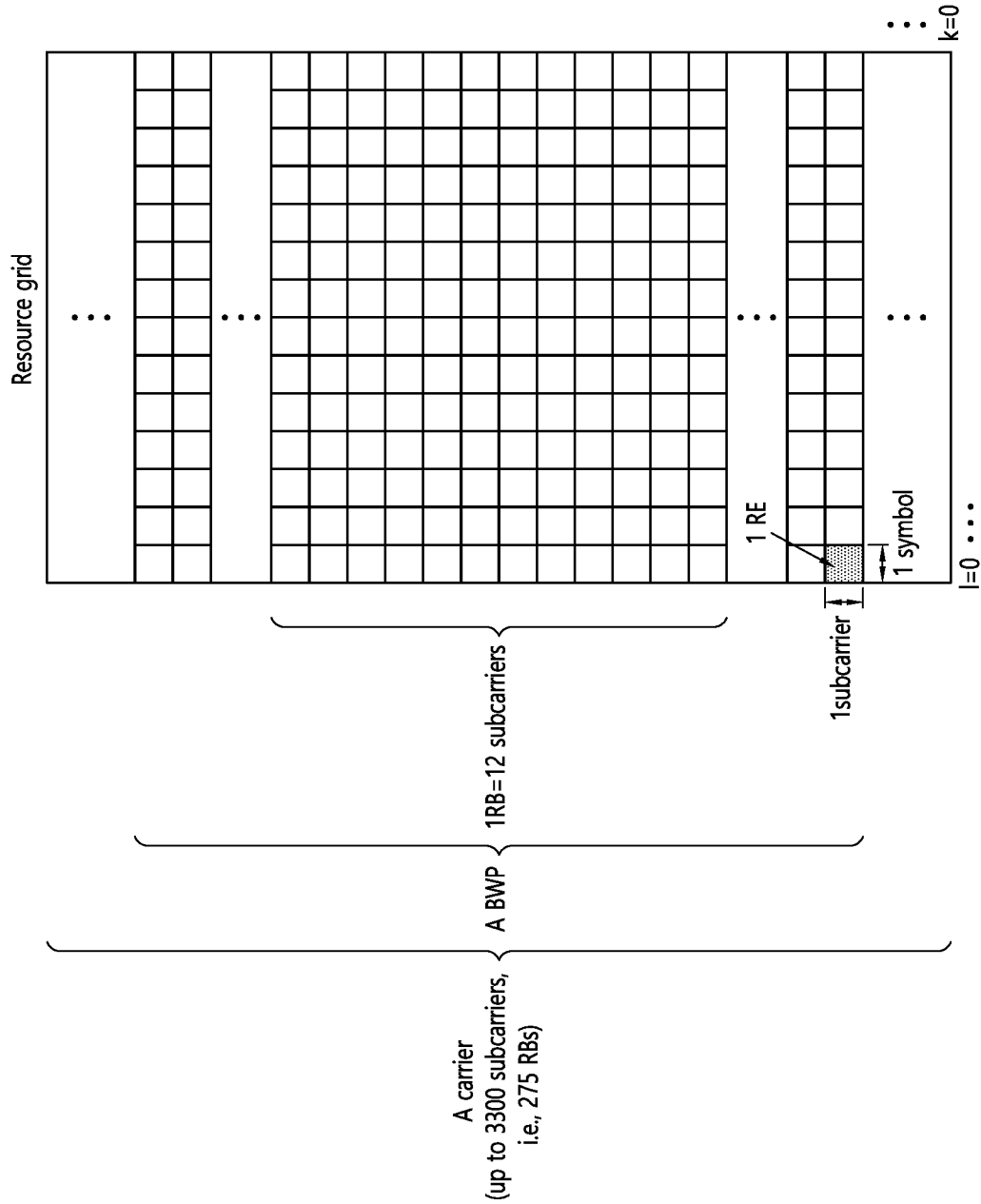
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 9:
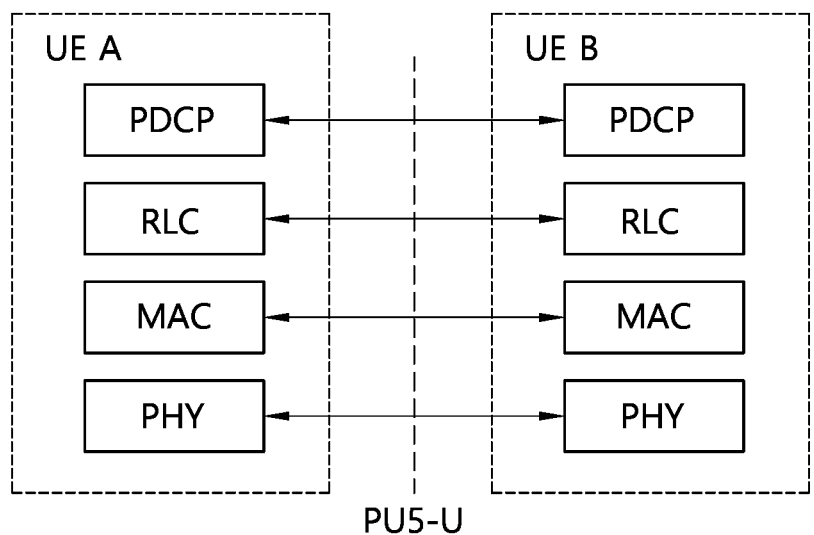
FIG. 9 shows a protocol stack for a sidelink communication to which the exemplary embodiment of the present disclosure can be applied.
Figure 9:
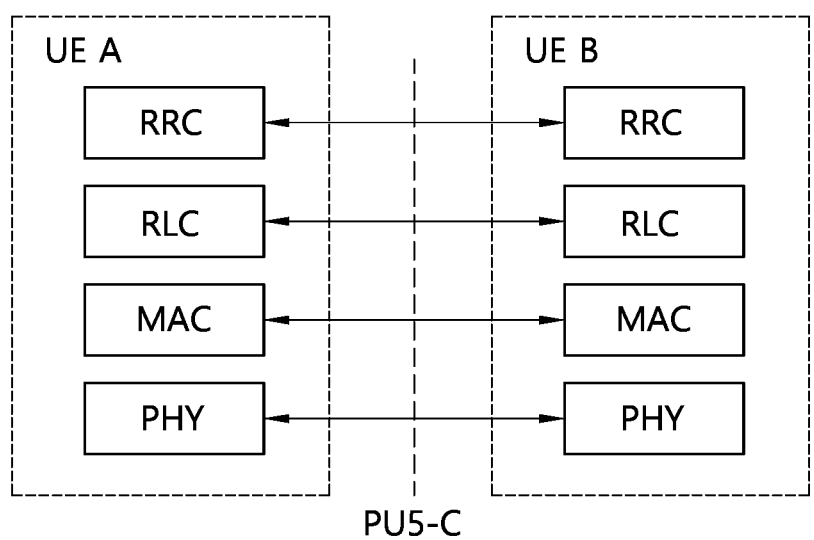

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

Figure 10:
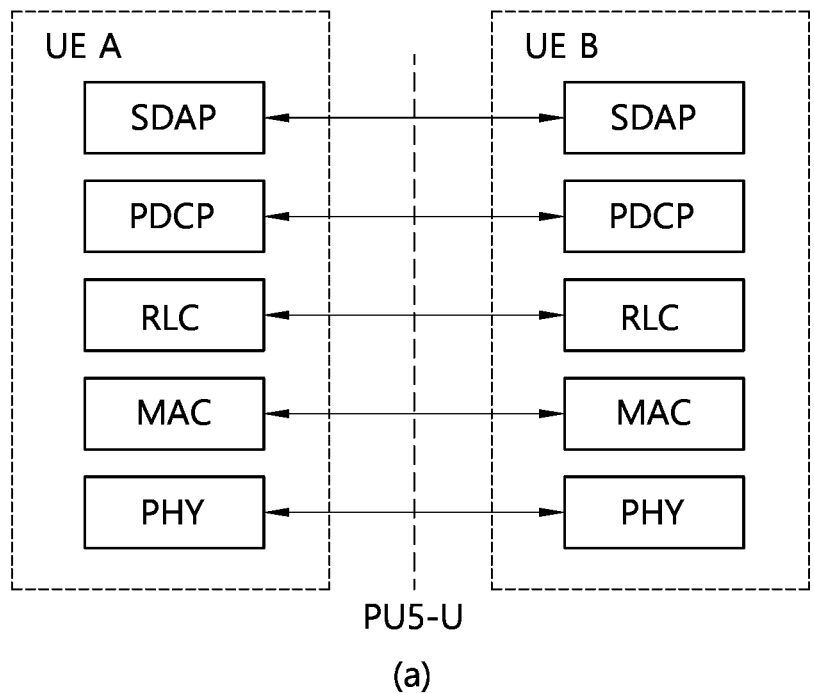
FIG. 10 shows a protocol stack for a sidelink communication to which the exemplary embodiment of the present disclosure can be applied.
Figure 10:
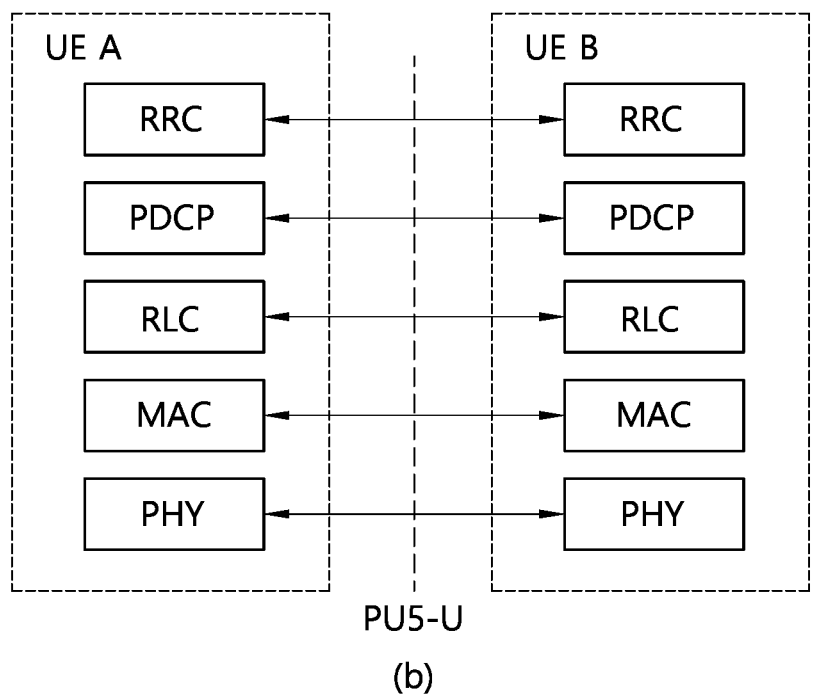

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
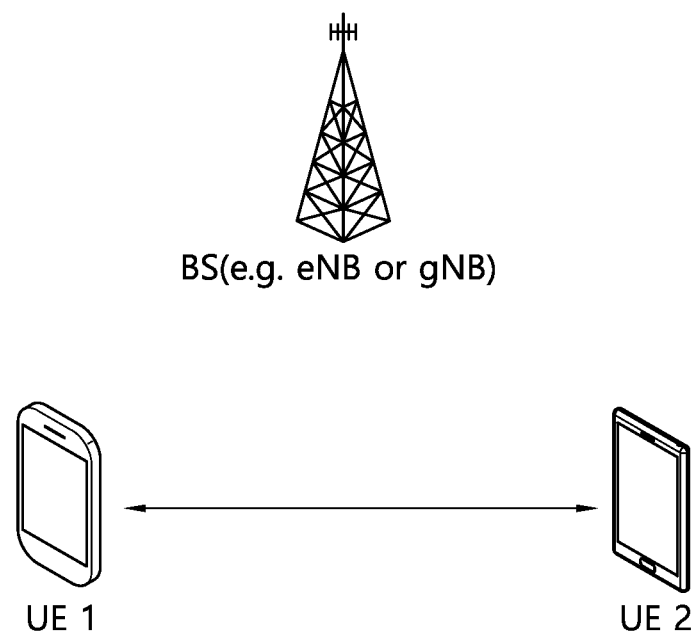
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
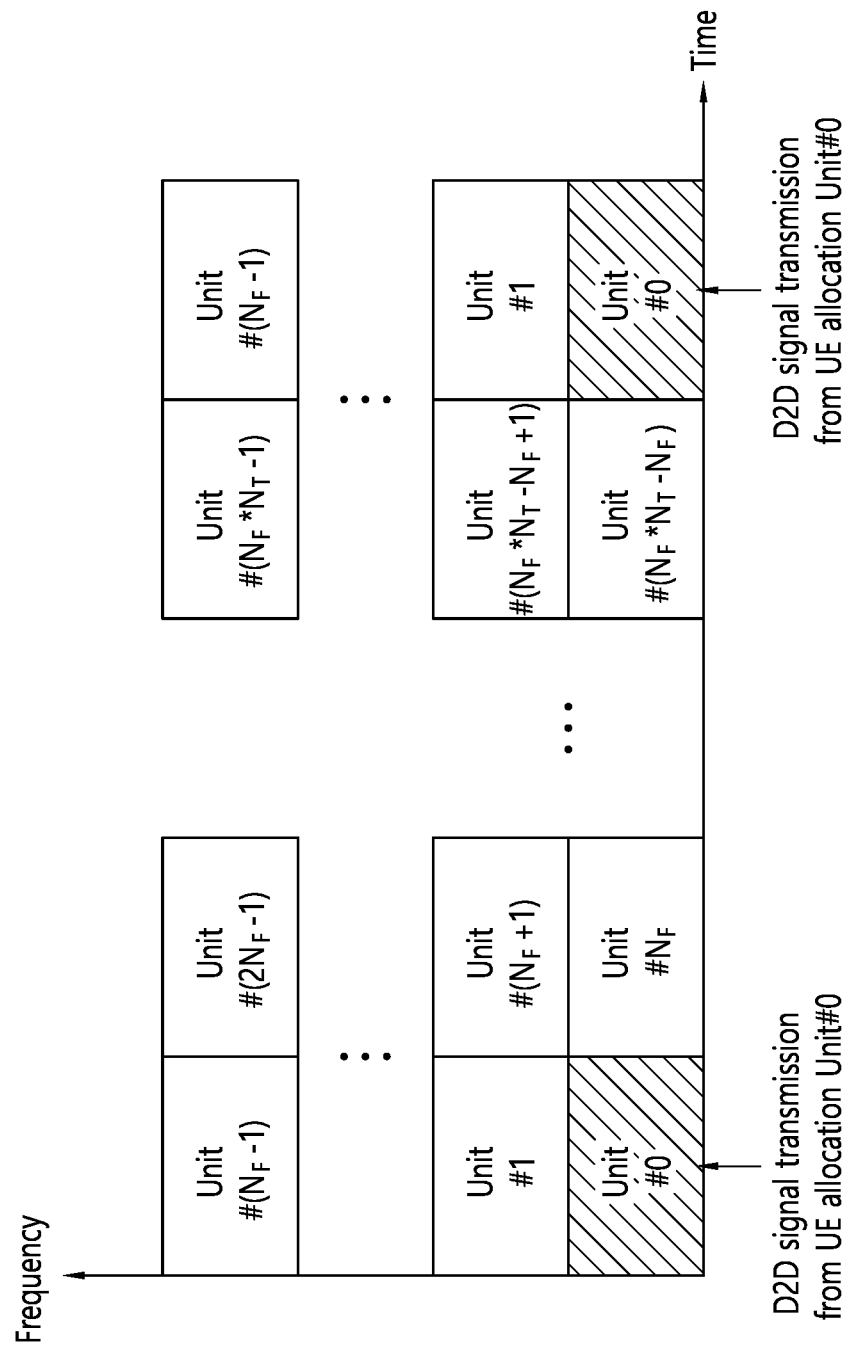
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
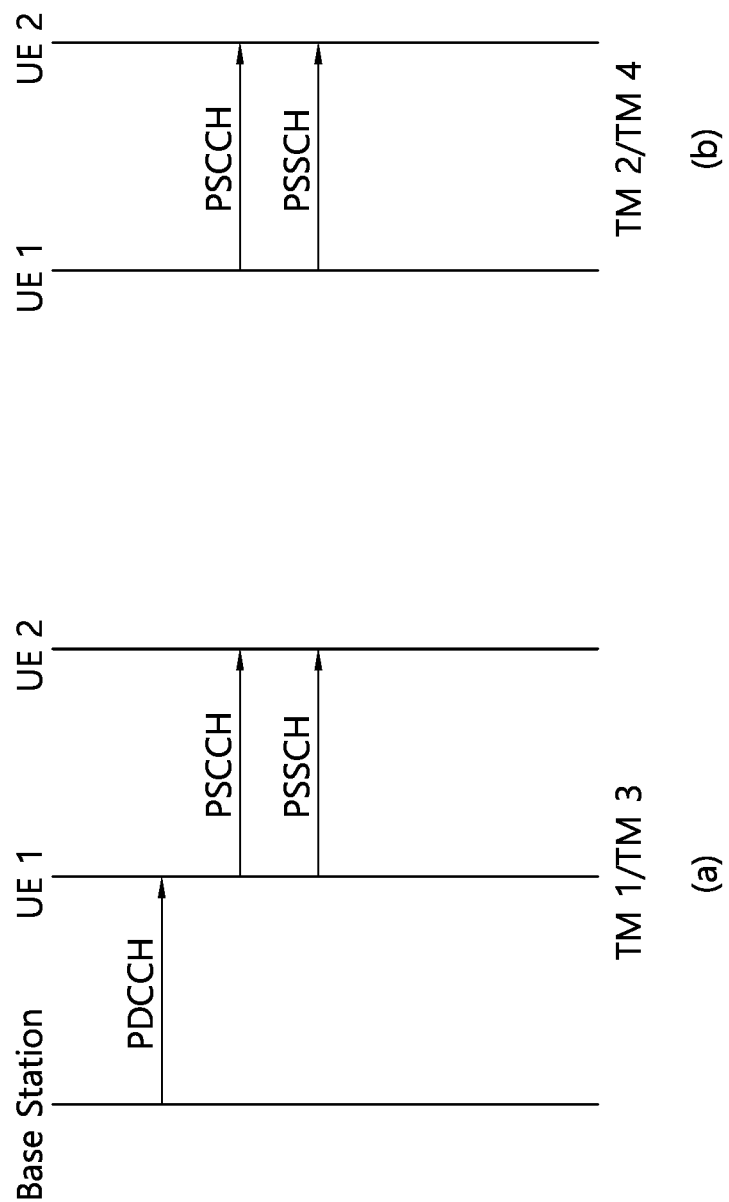
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a high layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 14:
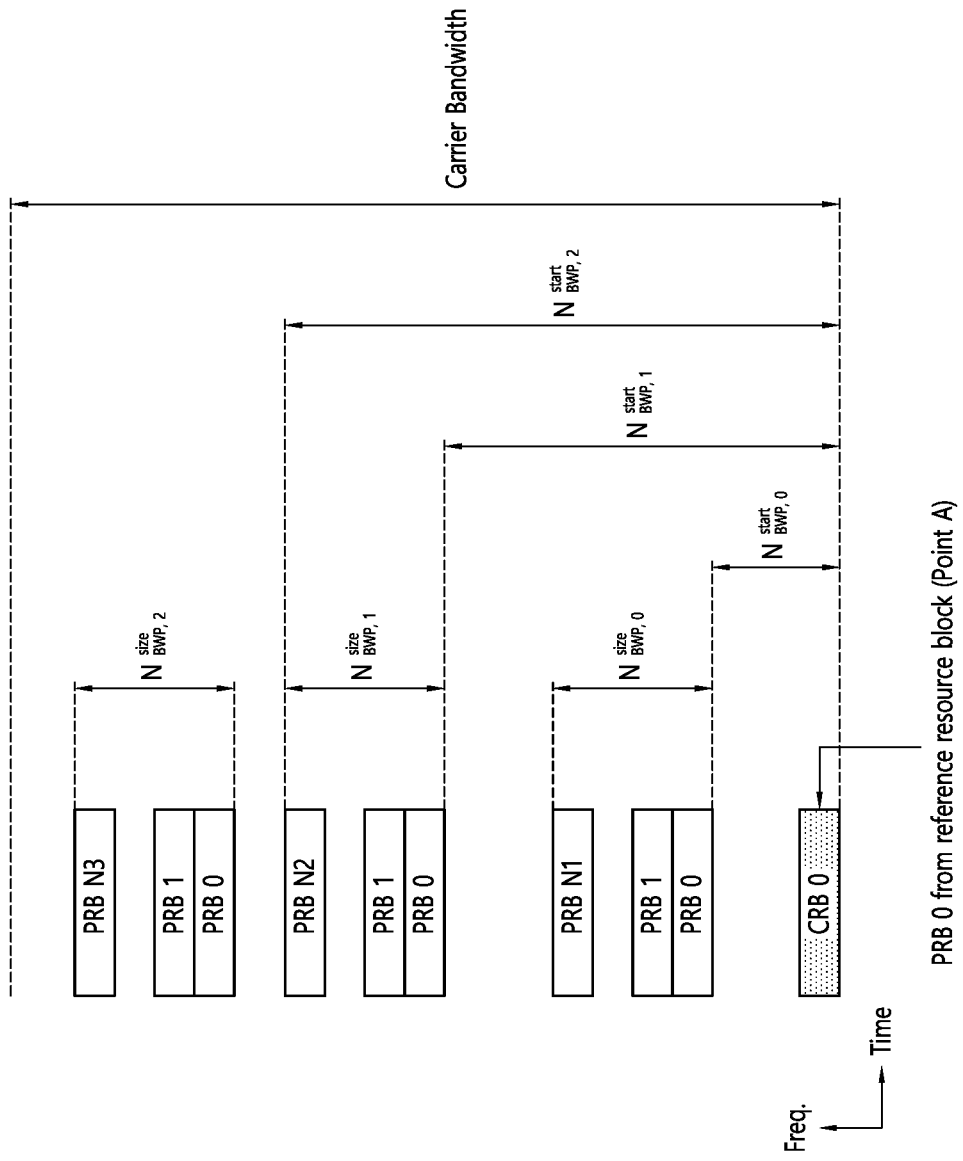
FIG. 14 shows an example of a BWP to which an embodiment of the present disclosure can be applied.

FIG. 14 shows an example of a BWP to which an embodiment of the present disclosure can be applied. In the embodiment of FIG. 14, it is assumed that three BWPs exist.

Referring to FIG. 14, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Meanwhile, in an NR system, a slot format is defined under a given numerology and/or active bandwidth part (BWP). And, a network (e.g., base station) may notify a slot format through a few types of signaling. Herein, a numerology may be an index indicating subcarrier spacing for one OFDM symbol, and an active BWP may be a BWP that is currently operating among all BWPs. According to a slot format configuration, a slot may include at least one of a symbol related to downlink, a symbol related to uplink, and/or a flexible symbol. In this specification, for simplicity in the description, a symbol related to downlink may be referred to as a downlink symbol, a D symbol, D, and a symbol related to uplink may be referred to as an uplink symbol, a U symbol, and U. And, a flexible symbol may be referred to as an F symbol, or F.

In an NR system, as described above, directions of a symbol within a slot have been defined as D, U, and F. The base station may configure a slot format configuration within a cell and may broadcast the slot format configuration. Additionally, the base station may configure a number of Ds, Us, and/or Fs and a cycle of change, and so on, in the slot format configuration. Additionally, under the broadcasted configuration, the base station may UE-specifically configure the slot format. Thus, the base station may assign (or allocate) an F symbol as a D symbol or U symbol, to the UE, with a specific object (or purpose). More specifically, information related to the slot format being delivered to the UE may be referred to as slot format related information (SFI). The SFI may indicate a slot or direction information of a symbol within a slot via semi-static D/U assignment (or allocation) being broadcasted within a cell through the system information, a group common physical downlink control channel (GC PDCCH) for a specific group, UE-specific downlink control information (DCI), and/or UE-specific RCC signaling.

As described above, according to a slot format detection process of a UE, the UE may receive indications of a slot format via another type of SFI related signaling, under the slot format that was configured via semi-static SFI, which is broadcasted within a normal cell. In this case, among the SFI related control signals, a relationship of priority levels may exist, as shown in Table 3. The UE may perform slot format detection in accordance with the priority levels shown in Table 3.

TABLE 3

Semi-static D/U assignment > UE-specific data ≥
GC PDCCH > UE-specific RRC configuration An override relationship may exist between a method for receiving and/or transmitting each type of signaling information for SFI delivery and a slot format. Reference may be made to 3GPP TS 38.213 for a detailed process of the same.

Figure 15:
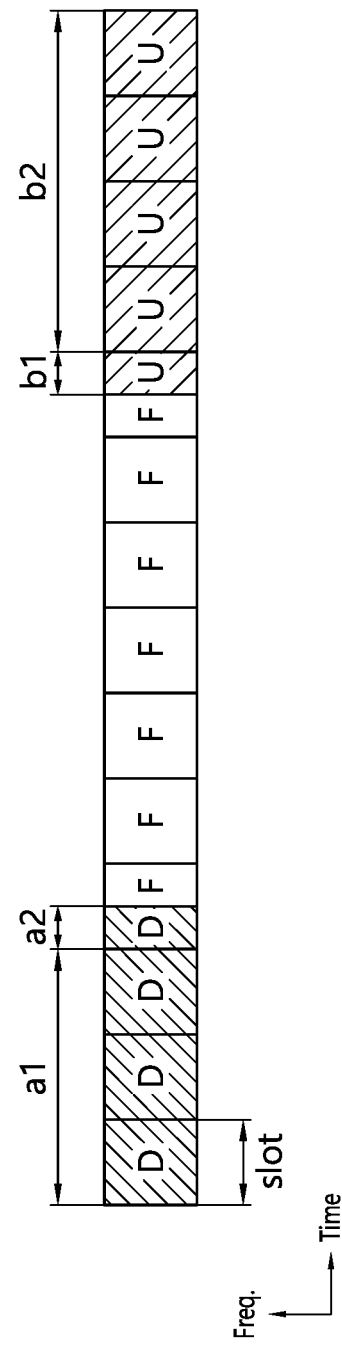
FIG. 15 shows an example of a slot format to which the exemplary embodiment of the present disclosure can be applied.

For example, in NR, a slot format, such as that shown in the embodiment of FIG. 15, may be defined via semi-static D/U assignment.

FIG. 15 shows an example of a slot format to which the exemplary embodiment of the present disclosure can be applied.

Referring to FIG. 15, a slot format may be defined by 4 parameters (e.g., a1, a2, b1, b2) for one cycle.

a1 may be a number of downlink slots, a2 may be a number of downlink symbols within a next slot of a last downlink slot, b2 may be a number of uplink slots, and b1 may be a number of uplink symbols within a previous slot of a first uplink slot. Additionally, a region that is not indicated by the parameter may be a flexible symbol.

As shown in the embodiment of FIG. 15, in an NR system, different formats (i.e., different directions) may be configured per symbol within a slot. Additionally, the UE may recognize information on symbol length via semi-static D/U assignment. For example, the UE may know information on symbol length via UE-specific RRC signaling (e.g., SIB). As described above, the UE may know a number of D symbols and/or a number of U symbols within a slot through information on a1, a2, b1, and b2, and the UE may recognize the remaining duration (or section) as F symbols. In the NR, as described above, unlike in the TDD system of LTE, a status between slots or between symbols may be controlled more flexibly through a flexible slot format configuration. Therefore, low latency traffic may be realized.

As described above, according to the legacy LTE V2X communication, the UE may select a resource unit corresponding to a specific resource within a resource pool, which denotes a series of resource sets, as shown in the embodiment of FIG. 12. And, the UE may transmit V2X related data by using the corresponding resource unit. As it may be verified in the embodiment of FIG. 12, within one resource pool, the entire (or whole) frequency resources may be divided into $N_F$ number of frequency resources, and the entire (or whole) time resources may be divided into $N_T$ number of time resources. Therefore, a total number of $N_F * N_T$ resource units may be defined. Additionally, the corresponding resource pool may be repeated at a cycle of $N_T$ subframes, and a time axis unit of one resource unit may be equal to 1 ms.

Meanwhile, for enhanced services requiring low latency and/or high data rate, the above-described flexible format configuration operations may be adopted to an NR V2X system. At this point, various problems may occur. For example, due to the above-described dynamic TDD operations of NR, directions between a resource unit, which is selected from a transmission resource pool that has been preconfigured by the transmitting UE, and a current resource format may vary, or granularity of the slots between the corresponding resource unit and the current resource format may vary.

For example, when it is assumed that the transmitting UE transmits a packet having latency requirement of 100 ms, the transmitting UE may select a resource unit that is to be used for transmission, by using a resource being preconfigured through system information or resource being UE-specifically configured. In an initial transmission, the transmitting UE performs transmission in accordance with the latency requirement. However, before the next transmission point, the slot format or V2X pool configuration within a cell may be changed. In this case, if the transmitting UE attempts a second transmission by using a resource pool that is assigned to the transmitting UE itself, if a duration related to the corresponding resource pool is not a sidelink duration, or due to a change in symbol granularity, the transmitting UE may fail to perform its second transmission.

Therefore, the NR V2X system may need resource management operations considering a slot format or V2X pool configuration that may be changed within a cell (or per specific UE).

Figure 16:
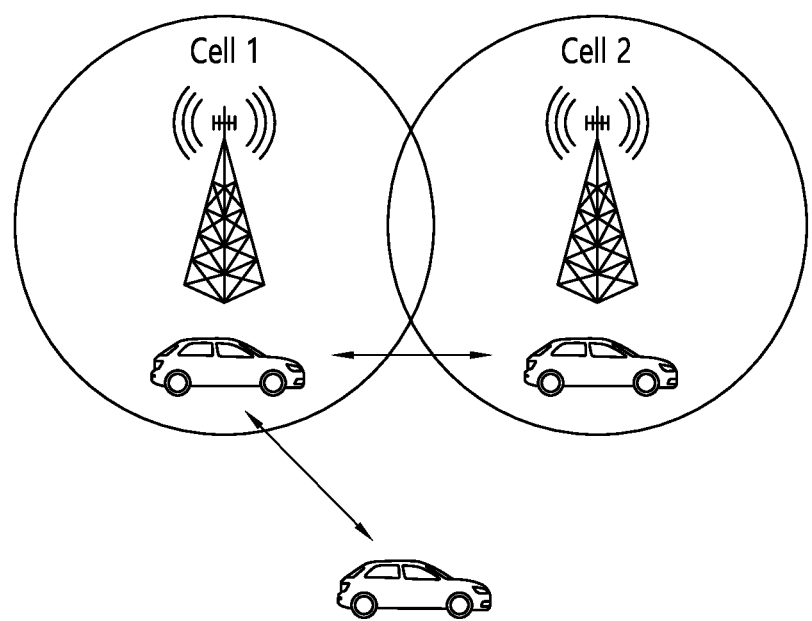
FIG. 16 is a drawing for describing a problem that may occur due to a flexible slot format, in a partial coverage communication or inter-cell communication.

Additionally, as shown in the embodiment of FIG. 16, problems may occur due to a flexible slot format, in a partial coverage or inter-cell communication.

FIG. 16 is a drawing for describing a problem that may occur due to a flexible slot format, in a partial coverage communication or inter-cell communication.

Referring to FIG. 16, for example, it is assumed that a first slot format configuration or a first V2X pool configuration is configured in Cell 1. In this case, both in-coverage UE or out-coverage UE may transmit and/or receive data traffic based on the first slot format configuration. Thereafter, when a second slot format configuration or second V2X pool configuration is reconfigured in Cell 1, the in-coverage UE may receive reconfiguration. Conversely, since the out-coverage UE uses the first slot format configuration without any modification, a mis-match may occur between the two UEs. Similarly, even in a case where the slot format differs between inter-cells (e.g., Cell 1 and Cell 2), a method for adjusting for signaling slot formats between cells or a method for signaling slot formats between cells may be needed.

The above-described content may be summarized as follows.

Firstly, in LTE V2X, the UE was capable of performing sidelink transmission in an uplink subframe. Conversely, in NR V2X, the UE may perform sidelink transmission in an uplink subframe from the U symbol and/or F symbol. Therefore, a method for determining a transmission resource pool based on the U symbol and/or F symbol may need to be proposed.

Additionally, in case the slot format or V2X pool configuration within a cell is changed, a transmission resource, which was reserved before being changed by the UE, may not be used for sidelink transmission due to a change in the slot format. Therefore, a method for managing this may need to be proposed.

Secondly, in a partial coverage communication, in case the slot format or V2X pool configuration within a cell (or of a specific UE) is changed, an in-coverage UE may need to deliver the changed slot format or V2X pool configuration to out-coverage UEs. Therefore, a method for delivering the changed slot format or V2X pool configuration may need to be proposed.

Thirdly, in inter-cell communication, in case the slot format or V2X pool configuration of each cell is changed, problems may occur in the communication between UEs each belonging to a different cell.

Therefore, according to an embodiment of the present disclosure, a method for resolving the above-described problems and a device for supporting the same will hereinafter be proposed.

Due to a change in the slot format, the resource that was previously reserved by the UE may not be available for usage at a current time point, Therefore, a method for handling the reserved resource is needed.

Figure 17:
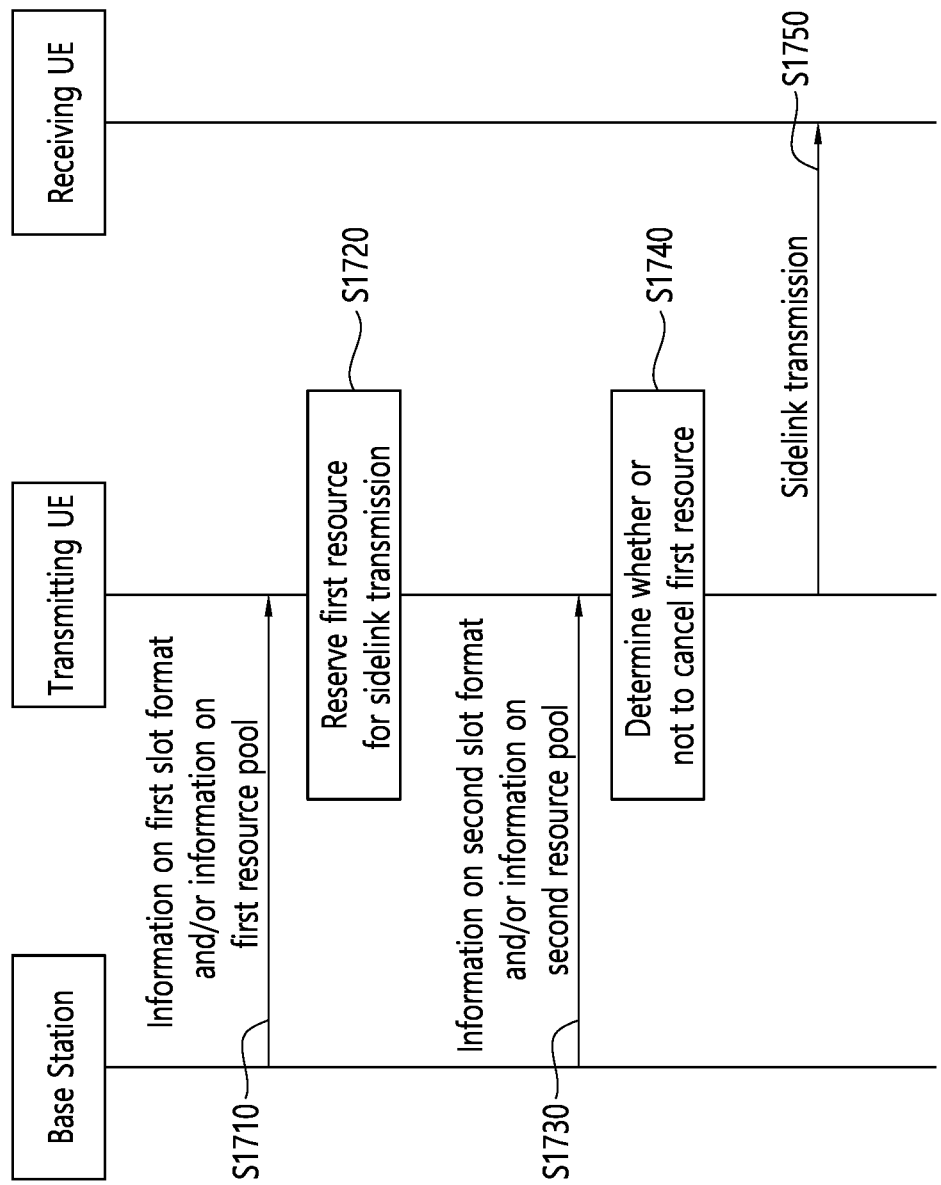
FIG. 17 shows a method for performing sidelink transmission, by a UE, according to an embodiment of the present disclosure.

FIG. 17 shows a method for performing sidelink transmission, by a UE, according to an embodiment of the present disclosure.

Referring to FIG. 17, in step S1710, a transmitting UE may receive information on a first slot format and/or information on a first resource pool from a base station.

In step S1720, based on the information on the first slot format and/or information on the first resource pool, the transmitting UE may reserve a first resource for sidelink transmission. After the first resource is reserved, the information on a slot format and/or information on a resource pool may be changed.

In step S1730, the transmitting UE may receive information on a second slot format and/or information on a second resource pool from the base station. For example, in case the slot format or V2X pool configuration within a cell is changed, the base station may periodically transmit a sidelink transmission pool (re-)configuration, which reflects information on the changed slot format or V2X pool configuration. Additionally, in order to well reflect the changed information, a transmission cycle of the sidelink transmission pool (re-)configuration may concur (or match) with a transmission cycle of semi-static D/U assignment. Alternatively, in order to well reflect the changed information, transmission of the sidelink transmission pool (re-)configuration may have to be performed earlier than the transmission of the semi-static D/U assignment.

1) In case a sidelink transmission opportunity is given only from U symbols, and in case a transmission resource pool is configured only of U symbols According to an embodiment of the present disclosure, the transmitting UE may perform sidelink transmission only on U symbols. Additionally, a resource pool for sidelink transmission may be configured only of U symbols. The transmitting UE may handle resources that are reserved in accordance with regulated pool (re-)configuration.

For example, in step S1740, the transmitting UE may cancel or drop all previously reserved resources. For example, after a pool reconfiguration, the transmitting UE may unconditionally cancel or drop all previously reserved resources.

Alternatively, for example, in step S1740, the transmitting UE may cancel or drop only a specific resource. For example, after a pool reconfiguration, the transmitting UE may cancel or drop only a specific resource. Herein, for example, the specific resource may be a resource that is misaligned between a size of a packet, which was intended to be transmitted by the transmitting UE, and a resource of the changed slot format or V2X pool configuration. Alternatively, for example, the specific resource may be a resource that is changed from a reserved resource to a different format (e.g., D or F). For example, if a 14-symbol resource within a slot, which was reserved by the transmitting UE for transmitting a packet of 100 bytes, can ensure only a 7-symbol resource, the transmitting UE may have to additionally assign half of the resources.

For example, the transmitting UE may occupy a new resource along a frequency axis as much as a ratio of symbols being decreased along a time axis. Such a resource occupation method may be a contention-based resource occupation method having no handling on an occupation collision (or conflict) of the same resources between multiple UEs.

For example, the transmitting UE may occupy a new resource along a time axis. For example, the transmitting UE may occupy a new resource along a time axis as much as a ratio of symbols being decreased along the time axis.

For example, the transmitting UE may use an additional dedicated resource pool. For example, the transmitting UE may configure an additional dedicated resource pool. Additionally, the transmitting UE may occupy a new resource from the dedicated resource pool as much as the ratio of symbols being decreased along the time axis. The transmitting UE may perform sidelink transmission by using the dedicated resource pool, and the transmitting UE may signal information on the corresponding resource to a receiving UE.

Alternatively, for example, in step S1740, the transmitting UE may maintain SPS based resource assignment of the legacy LTE based on reservation. In case the slot format or V2X pool configuration is changed, the transmitting UE may know the changed slot format through the pool reconfiguration. In this case, if the transmitting UE determines that part of the resource reserved by the transmitting UE itself is valid, considering the decreased (or increased) resources, the transmitting UE may perform transmission after performing packet segmentation from a PHY layer. For example, after performing packet segmentation, the transmitting UE may continue to transmit the remaining part of the packet at a next transmission opportunity (or transport opportunity).

2) In case a sidelink transmission opportunity is given only from U symbols and F symbols, and in case a transmission resource pool is configured only of U symbols According to an embodiment of the present disclosure, the transmitting UE may perform sidelink transmission on U symbols and F symbols. Additionally, a resource pool for sidelink transmission may be configured only of U symbols. The transmitting UE may handle resources that are reserved in accordance with the regulated pool (re-)configuration. In this case, additionally, the base station may indicate to the UE that an F symbol is a sidelink resource. For example, the base station may indicate to the UE that the F symbol may be used for sidelink transmission. For example, the F symbol may be a resource being common to UEs (e.g., V2X UEs) within a cell. For example, the F symbol may be a UE-specific resource. For example, the F symbol being a sidelink resource may be indicated via a group common PDCCH (DCI format2_0) of NR, UE-specific data (other DCI format), and/or UE-specific RRC signaling.

For example, in step S1740, the transmitting UE may cancel or drop all previously reserved resources. For example, after a pool reconfiguration, the transmitting UE may unconditionally cancel or drop all previously reserved resources.

Alternatively, for example, in step S1740, the transmitting UE may cancel or drop only a specific resource. For example, after a pool reconfiguration, the transmitting UE may cancel or drop only a specific resource. Herein, for example, the specific resource may be a resource that is misaligned between a size of a packet, which was intended to be transmitted by the transmitting UE, and a resource of the changed slot format or V2X pool configuration. Alternatively, for example, the specific resource may be a resource that is changed from a reserved resource to a different format (e.g., D or F). For example, if a 14-symbol resource within a slot, which was reserved by the transmitting UE for transmitting a packet of 100 bytes, can ensure only a 7-symbol resource, the transmitting UE may have to additionally assign half of the resources.

For example, the transmitting UE may occupy a new resource along a frequency axis as much as a ratio of symbols being decreased along a time axis. Such a resource occupation method may be a contention-based resource occupation method having no handling on an occupation collision (or conflict) of the same resources between multiple UEs.

For example, the transmitting UE may occupy a new resource along a time axis. For example, the transmitting UE may occupy a new resource along a time axis as much as a ratio of symbols being decreased along the time axis.

For example, the transmitting UE may use an additional dedicated resource pool. For example, the transmitting UE may configure an additional dedicated resource pool. Additionally, the transmitting UE may occupy a new resource from the dedicated resource pool as much as the ratio of symbols being decreased along the time axis. The transmitting UE may perform sidelink transmission by using the dedicated resource pool, and the transmitting UE may signal information on the corresponding resource to a receiving UE.

Alternatively, for example, in step S1740, the transmitting UE may maintain SPS based resource assignment of the legacy LTE based on reservation. In case the slot format or V2X pool configuration is changed, the transmitting UE may know the changed slot format through the pool reconfiguration. In this case, if the transmitting UE determines that part of the resource reserved by the transmitting UE itself is valid, considering the decreased (or increased) resources, the transmitting UE may perform transmission after performing packet segmentation from a PHY layer. For example, after performing packet segmentation, the transmitting UE may continue to transmit the remaining part of the packet at a next transmission opportunity (or transport opportunity).

Alternatively, for example, since a resource pool is basically configured of U symbols, in step S1740, the transmitting UE may perform U symbol-based resource reservation. If the transmitting UE failed to transmit a packet at a transmission point due to a change in the slot format or V2X pool configuration, and if F symbols are additionally assigned as sidelink resource, the transmitting UE may perform sidelink transmission by using the F symbols. Additionally, the transmitting UE may signal the corresponding resource information to another UE. If multiple UEs occupy the F symbols at the same time, a collision (or conflict) may occur. Therefore, in order to prevent such collision (or conflict) from occurring, the base station may have to assign F symbols.

3) In case a sidelink transmission opportunity is given only from U symbols and F symbols, and in case a transmission resource pool is configured of U symbols and F symbols According to an embodiment of the present disclosure, the transmitting UE may perform sidelink transmission only U symbols and F symbols. Additionally, a resource pool for sidelink transmission may be configured of U symbols and F symbols. The transmitting UE may handle resources that are reserved in accordance with regulated pool (re-)configuration.

For example, in step S1740, the transmitting UE may cancel or drop all previously reserved resources. For example, after a pool reconfiguration, the transmitting UE may unconditionally cancel or drop all previously reserved resources.

Alternatively, for example, in step S1740, the transmitting UE may cancel or drop only a specific resource. For example, after a pool reconfiguration, the transmitting UE may cancel or drop only a specific resource. Herein, for example, the specific resource may be a resource that is misaligned between a size of a packet, which was intended to be transmitted by the transmitting UE, and a resource of the changed slot format or V2X pool configuration. Alternatively, for example, the specific resource may be a resource that is changed from a reserved resource to a different format (e.g., D or F). For example, if a 14-symbol resource within a slot, which was reserved by the transmitting UE for transmitting a packet of 100 bytes, can ensure only a 7-symbol resource, the transmitting UE may have to additionally assign half of the resources.

For example, the transmitting UE may occupy a new resource along a frequency axis as much as a ratio of symbols being decreased along a time axis. Such a resource occupation method may be a contention-based resource occupation method having no handling on an occupation collision (or conflict) of the same resources between multiple UEs.

For example, the transmitting UE may occupy a new resource along a time axis. For example, the transmitting UE may occupy a new resource along a time axis as much as a ratio of symbols being decreased along the time axis.

For example, the transmitting UE may use an additional dedicated resource pool. For example, the transmitting UE may configure an additional dedicated resource pool. Additionally, the transmitting UE may occupy a new resource from the dedicated resource pool as much as the ratio of symbols being decreased along the time axis. The transmitting UE may perform sidelink transmission by using the dedicated resource pool, and the transmitting UE may signal information on the corresponding resource to a receiving UE.

Alternatively, for example, in step S1740, the transmitting UE may maintain SPS based resource assignment of the legacy LTE based on reservation. In case the slot format or V2X pool configuration is changed, the transmitting UE may know the changed slot format through the pool reconfiguration. In this case, if the transmitting UE determines that part of the resource reserved by the transmitting UE itself is valid, considering the decreased (or increased) resources, the transmitting UE may perform transmission after performing packet segmentation from a PHY layer. For example, after performing packet segmentation, the transmitting UE may continue to transmit the remaining part of the packet at a next transmission opportunity (or transport opportunity).

According to the procedure that is proposed as described above, the transmitting UE may cancel and/or reserve transmission resources. And, in step S1750, the transmitting UE may perform sidelink transmission for a receiving UE by using transmission resources.

According to an embodiment of the present disclosure, the change in the slot format or V2X pool configuration may be cell-specific or UE-specific. For example, in case the slot format or V2X pool configuration is cell-specifically changed, the corresponding information may be notified to UEs within a cell through the pool configuration. For example, in case the slot format or V2X pool configuration is UE-specifically changed, the transmitting UE may signal its own UE-specific slot configuration to a receiving UE. In this specification, the signaling may include transmission of control information or data to a receiving UE through a pre-defined channel (e.g., PSCCH, PSBCH, PSSCH).

According to an embodiment of the present disclosure, in case the slot format or V2X pool configuration within a cell (or of a specific UE) is changed in a partial coverage communication, an in-coverage UE may deliver the changed slot format or V2X pool configuration to an out-coverage UE. For example, in case the slot format or V2X pool configuration is changed, the in-coverage UE may broadcast the changed slot format or V2X pool configuration to the out-coverage UE.

For example, in case an in-coverage transmitting UE is required to notify a changed slot format or V2X pool configuration to an out-coverage receiving UE, due to a change in the slot format or V2X pool configuration (e.g., event-based), the in-coverage transmitting UE may transmit event-triggered SL-MIB or SIB information to the out-coverage receiving UE. For example, the out-coverage UE may control a bitmap related to a transmission pool or a receiving pool based on a slot format or V2X pool configuration, which is received from the in-coverage UE.

For example, in case an out-coverage UE determines that a slot format, which the out-coverage UE had previously obtained through SIB or SL-MIB, is different from the current slot format, the out-coverage UE may request, to the in-coverage UE, transmission of SIB or SL-MIB including slot format. In this case, as a response to such request, the in-coverage UE may transmit on-demand SIB or SL-MIB to the out-coverage UE.

For example, the slot format may be periodically broadcasted, by using a specific resource (e.g., specific resource of PSBCH, specific resource of PSSCH, or specific resource of PSCCH) of a pre-defined channel Information on the slot format may be transmitted by some UEs, and not all UEs, within a cell. For example, information on the slot format may be transmitted by a specific UE or road side unit (RSU) within a cell.

For example, the resource for such delivery may be transmitted through a pre-defined channel. For example, a UE-shared PSSCH resource may be pre-defined and may be transmitted in a PSSCH format. Alternatively, control information within a PSCCH may be used. Alternatively, a specific resource within a PSBCH may be used.

According to an embodiment of the present disclosure, an in-coverage UE may perform transmission by using minimum U symbols for communication with an out-coverage UE. Accordingly, for example, even if the UE becomes capable of additionally using F symbols due to a change in the slot format, the UE may abandon (or renounce) resource related to the corresponding F symbols. That is, the UE may not use F symbols for sidelink transmission.

According to an embodiment of the present disclosure, for inter-cell communication, the slot format or V2X pool configuration may be the same among cells. That is, in sidelink communication, all cells may use the same slot format or V2X pool configuration. Furthermore, in sidelink transmission, the slot format or V2X pool configuration may be changed together in all cells.

According to an embodiment of the present disclosure, even if the slot format or V2X pool configuration is different among the cells, for inter-cell communication, a base station being related to each cell (e.g., serving cell) may additionally broadcast the slot format or V2X pool configuration per cell. That is, a serving cell may broadcast slot format or V2X pool configuration information, which is configuration information of a neighboring base station in the surroundings of the serving cell. For example, the slot format or V2X pool configuration related to a neighboring cell and the serving cell may be exchanged or delivered via backhaul among base stations. For example, the UE may receive slot format of the serving cell and slot format of another cell together from the serving cell of the UE, via cell-specific RRC signaling, UE-specific RRC signaling, or SIB.

According to an embodiment of the present disclosure, if a UE belonging to a specific cell determines that slot format or V2X pool configuration that is known through SIB, which has been previously received from a base station that manages the specific cell, is different from slot format or V2X pool configuration of a UE belonging to another cell, the UE belonging to the specific cell may request, to the UE belonging to another cell, transmission of slot format or V2X pool configuration. Additionally, the UE belonging to another cell may deliver SIB or SL-MIB including its slot format or V2X pool configuration to the UE belonging to the specific cell. For example, the slot format or V2X pool configuration may be delivered through a sidelink control channel, a sidelink broadcast channel, and/or a sidelink data channel. For example, the slot format or V2X pool configuration may be delivered through PSCCH, PSBCH, and/or PSSCH.

According to an embodiment of the present disclosure, if a UE belonging to a specific cell (e.g., serving cell) determines that slot format or V2X pool configuration that is known through SIB, which has been previously received from a base station that manages the specific cell, is different from slot format or V2X pool configuration of a UE belonging to another cell (e.g., neighboring cell), the UE belonging to the specific cell may request, to a base station managing the other cell, to transmit slot format or V2X pool configuration. Additionally, the base station managing the other cell may broadcast SIB including slot format or V2X pool configuration. Alternatively, the base station managing the other cell may periodically broadcast SIB including slot format or V2X pool configuration even if the above-described request is made. According to the above-described operation, even if the slot format or V2X pool configuration is different among cells, the UE may receive slot format or V2X pool configuration from the base station managing the other cell. And, by using the received slot format or V2X pool configuration, the UE may control a transmission pool or reception pool.

Figure 18:
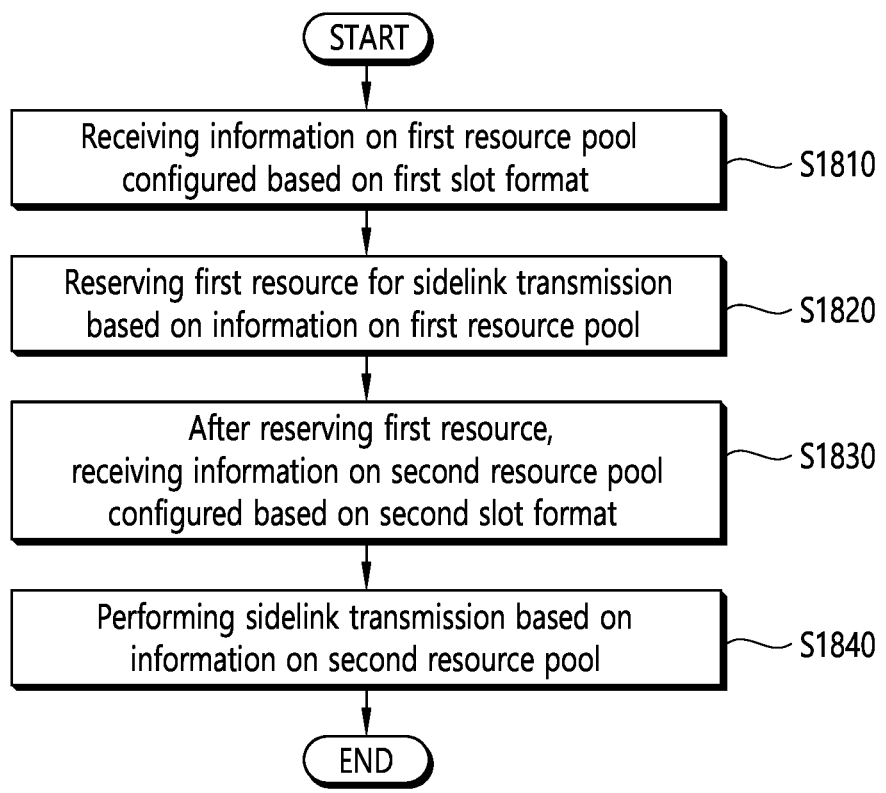
FIG. 18 shows a method for performing sidelink transmission, by a first device (100), according to an embodiment of the present disclosure.

FIG. 18 shows a method for performing sidelink transmission, by a first device (100), according to an embodiment of the present disclosure.

Referring to FIG. 18, in step S1810, a first device (100) may receive information on a first resource pool, which is configured based on a first slot format.

In step S1820, the first device (100) may reserve a first resource for the sidelink transmission based on the first resource pool.

In step S1830, after reserving the first resource, the first device (100) may receive information on a second resource pool being configured based on a second slot format. For example, the first slot format and the second slot format may be different.

For example, the first resource pool and the second resource pool may be configured based on symbols related to uplink. In this case, additionally, the first device (100) may receive information indicating that flexible symbols are resource for the sidelink transmission.

For example, the first resource pool and the second resource pool may be configured based on symbols related to uplink and flexible symbols.

In step S1840, the first device (100) may perform the sidelink transmission based on the information on the second resource pool.

Additionally, if the first device (100) determines to cancel the first resource based on the information on the second resource pool, the first device (100) may reserve a second resource for the sidelink transmission based on information on the second resource pool. In this case, the sidelink transmission may be performed on the second resource. For example, the second resource may be reserved by various methods proposed in this specification.

Additionally, in the first slot format, due to a change in the second slot format, if part of the first resource cannot be used for the sidelink transmission, the first device (100) may reserve a third resource for the sidelink transmission. For example, the third resource may be resource for the sidelink transmission being adjacent to the first resource within a frequency domain. For example, the third resource may be a resource for the sidelink transmission being positioned before or after the first resource within a time domain. In this case, the sidelink transmission may be performed on the first resource and the third resource. For example, the third resource may be reserved by various methods proposed in this specification.

Additionally, if the first slot format is changed to the second slot format, the first device (100) may transmit information on the second slot format or information on the second resource pool to a second device (200). In this case, the second device (200) may be located outside of a base station coverage.

For example, information on a slot format of a neighboring base station may be transmitted to the base station. In this case, additionally, the first device (100) may receive, from the base station, information on slot format of the base station and information on slot format of the neighboring base station.

According to an embodiment of the present disclosure, due to the change in the slot format, in case part or all of the reserved resources cannot be used for the sidelink transmission, the UE may efficiently perform sidelink transmission.

The proposed method may be performed by various devices described in this specification. For example, a processor (102) of the first device (100) may control a transceiver (106) to receive information on a first resource pool, which is configured based on a first slot format. Additionally, the processor (102) of the first device (100) may reserve a first resource for the sidelink transmission based on the information on the first resource pool. After reserving the first resource, the processor (102) of the first device (100) may control the transceiver (106) to receive information on a second resource pool, which is configured based on a second slot format. Additionally, the processor (102) of the first device (100) may control the transceiver (106) to perform the sidelink transmission based on the information on the second resource pool.

Since the examples of the above-described proposed method may also be included as one of the implementation methods of the present disclosure, it will be apparent that the examples of the above-described proposed method can be considered as types of proposed methods. Additionally, although the above-described proposed methods may be independently implemented (or embodied), the implementation may also be carried out in a combined (or integrated) form of part of the proposed methods. Herein, rules may be defined so that information on the application or non-application of the proposed methods (or information on the rules of the proposed methods) can be notified to a UE, by a base station, or to a receiving UE, by a transmitting UE, through a predefined signal (e.g., physical layer signal or high layer signal).

Hereinafter, an apparatus to which the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
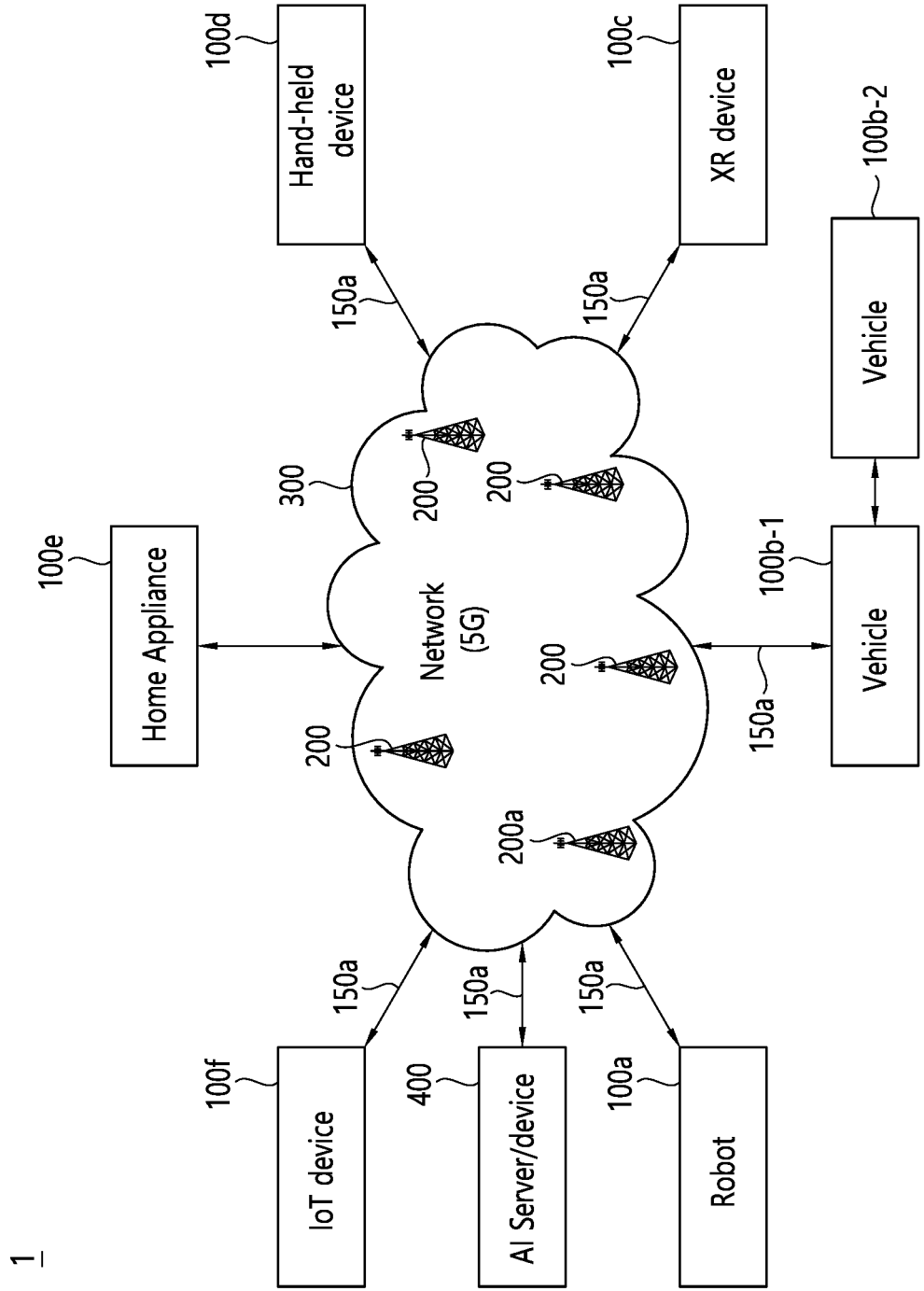
FIG. 19 shows a communication system (1) applied to the present disclosure.

FIG. 19 shows a communication system (1) applied to the present disclosure.

Referring to FIG. 19, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
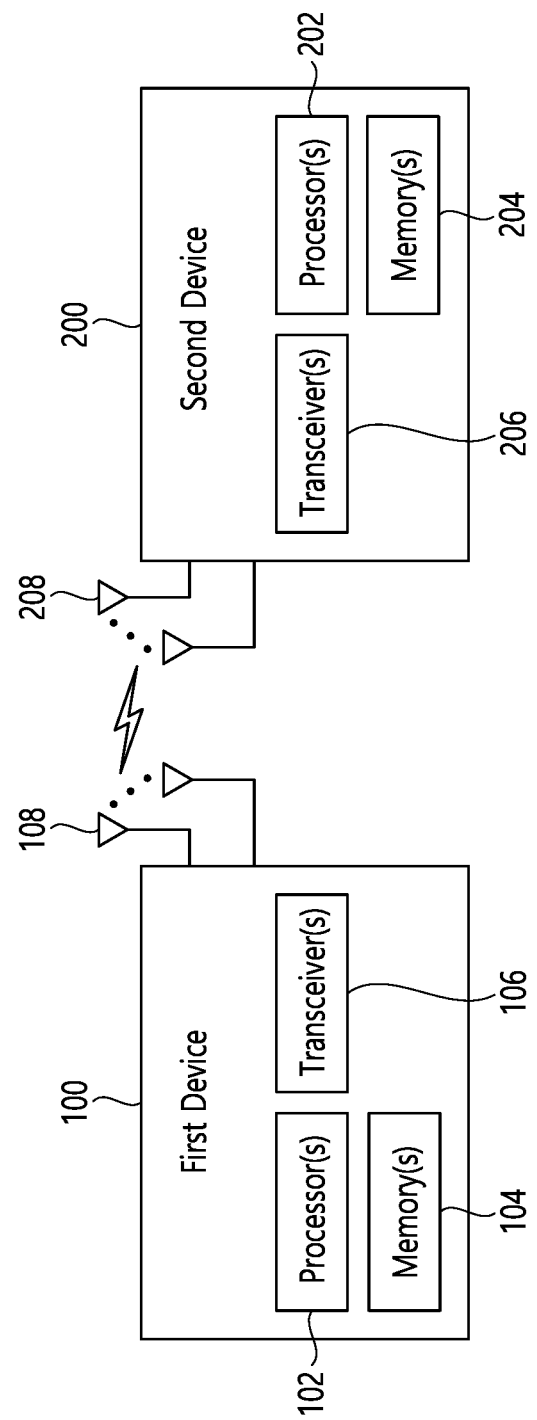
FIG. 20 shows wireless devices applicable to the present disclosure.

FIG. 20 shows wireless devices applicable to the present disclosure.

Referring to FIG. 20, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 19.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 21:
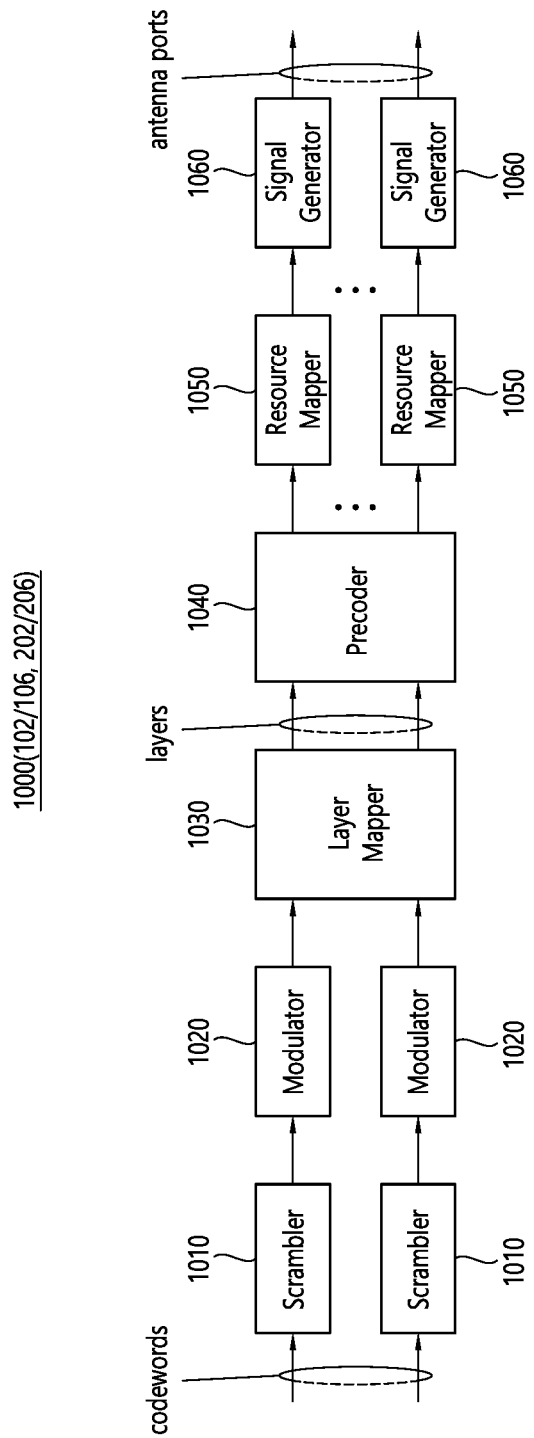
FIG. 21 shows a signal process circuit for a transmission signal.

FIG. 21 shows a signal process circuit for a transmission signal.

Referring to FIG. 21, a signal processing circuit (1000) may include scramblers (1010), modulators (1020), a layer mapper (1030), a precoder (1040), resource mappers (1050), and signal generators (1060). An operation/function of FIG. 21 may be performed, without being limited to, the processors (102, 202) and/or the transceivers (106, 206) of FIG. 20. Hardware elements of FIG. 21 may be implemented by the processors (102, 202) and/or the transceivers (106, 206) of FIG. 20. For example, blocks 1010~1060 may be implemented by the processors (102, 202) of FIG. 20. Alternatively, the blocks 1010 to 1050 may be implemented by the processors (102, 202) of FIG. 20 and the block 1060 may be implemented by the transceivers (106, 206) of FIG. 20.

Codewords may be converted into radio signals via the signal processing circuit (1000) of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 21. For example, the wireless devices (e.g., 100, 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
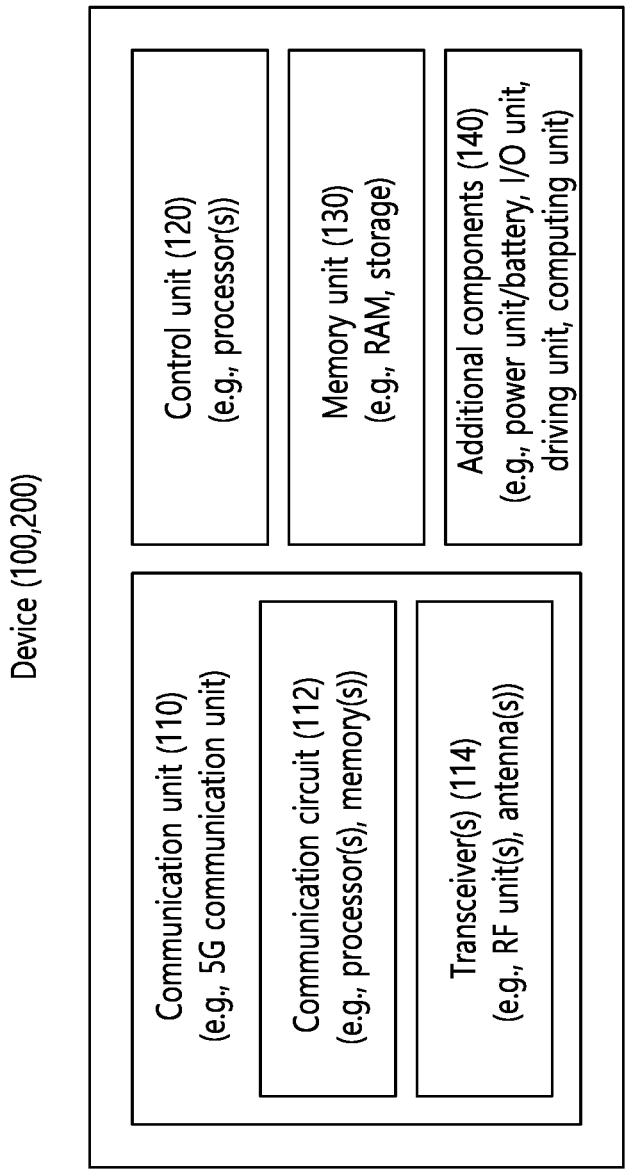
FIG. 22 shows another example of a wireless device applied to the present disclosure.

FIG. 22 shows another example of a wireless device applied to the present disclosure. The wireless device may be implemented in various forms according to a use-case/service (refer to FIG. 19 and FIGS. 26 to 31).

Referring to FIG. 22, wireless devices (100, 200) may correspond to the wireless devices (100, 200) of FIG. 20 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 20. For example, the transceiver(s) (114) may include the one or more transceivers (106, 206) and/or the one or more antennas (108, 208) of FIG. 20. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 19), the vehicles (100*b*-1, 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal (or UE), a hologram device, a public safety device, an MTC device, a medicine device, a fintech device (or a finance device), a security device, a climate/environment device, the AI server/device (400 of FIG. 19), the BSs (200 of FIG. 19), a network node, and so on. The wireless device may be used in a mobile or fixed place according to a use-example/service.

In FIG. 22, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
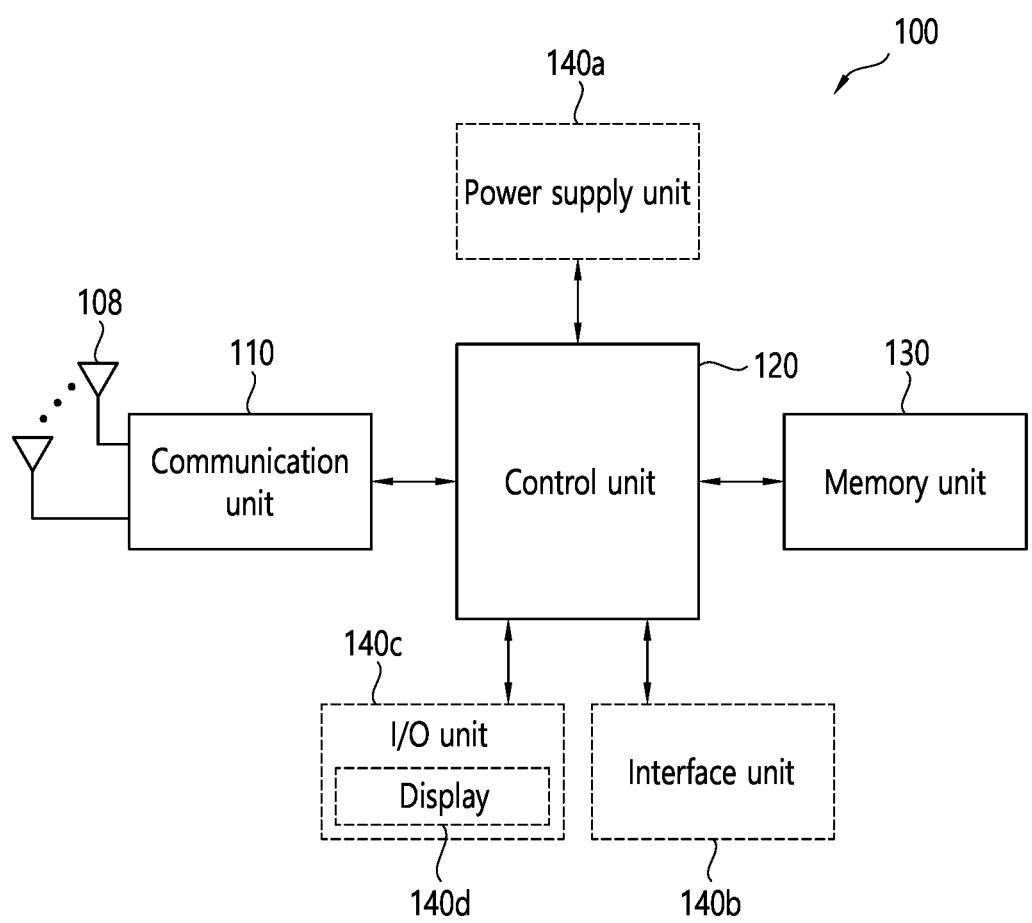
FIG. 23 shows a hand-held device applied to the present disclosure.

FIG. 23 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 22, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 24:
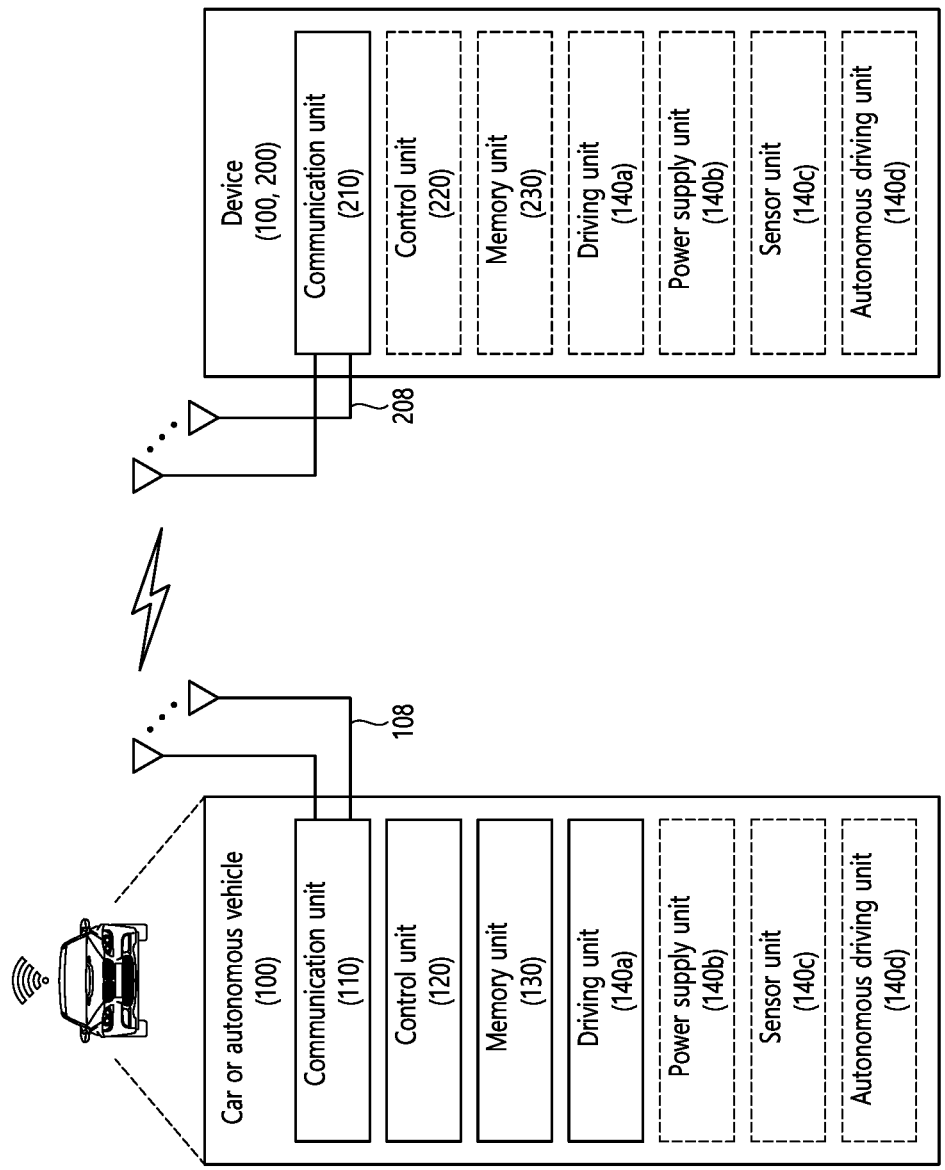
FIG. 24 shows a vehicle or an autonomous driving vehicle applied to the present disclosure.

FIG. 24 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 24, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 22, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, and so on. The power supply unit (140b) may supply power to the vehicle or the autonomous driving vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous driving vehicle (100) may move along the autonomous driving path according to the driving plan (e.g., speed/direction control). In the middle of autonomous driving, the communication unit (110) may aperiodic ally/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 25:
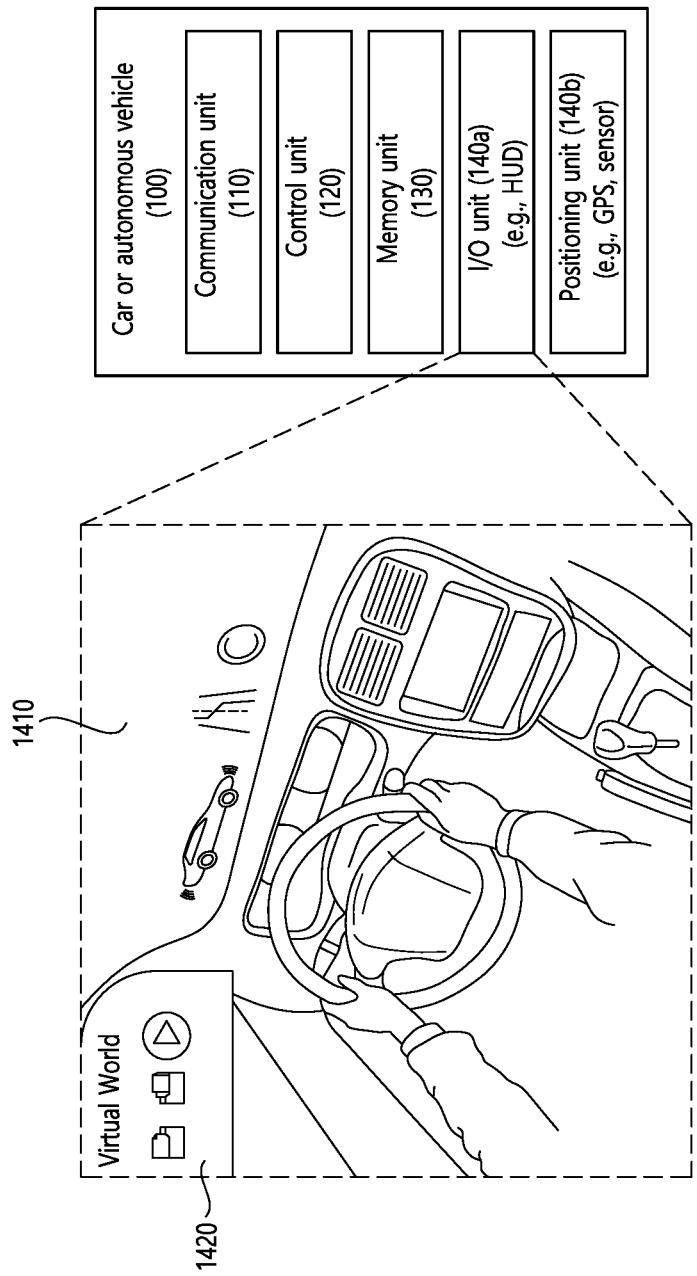
FIG. 25 shows a vehicle applied to the present disclosure.

FIG. 25 shows a vehicle applied to the present disclosure. The vehicle may be implemented as a transport means, an aerial vehicle, a ship, and so on.

Referring to FIG. 25, a vehicle (100) may include a communication unit (110), a control unit (120), a memory unit (130), an I/O unit (140a), and a positioning unit (140b). Herein, the blocks 110 to 130/140a~140b correspond to blocks 110 to 130/140 of FIG. 22.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include a HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 26:
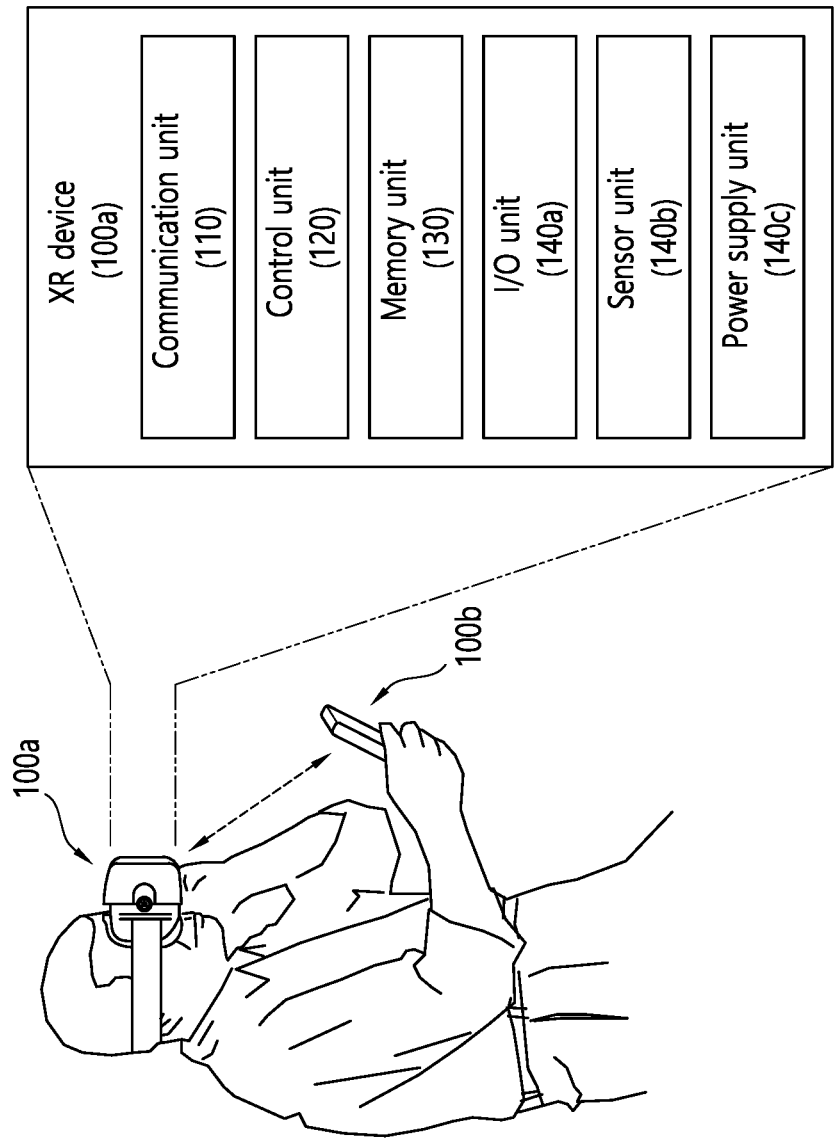
FIG. 26 shows an XR device applied to the present disclosure.

FIG. 26 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 26, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*~140*c* correspond to the blocks 110 to 130/140 of FIG. 22, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 27:
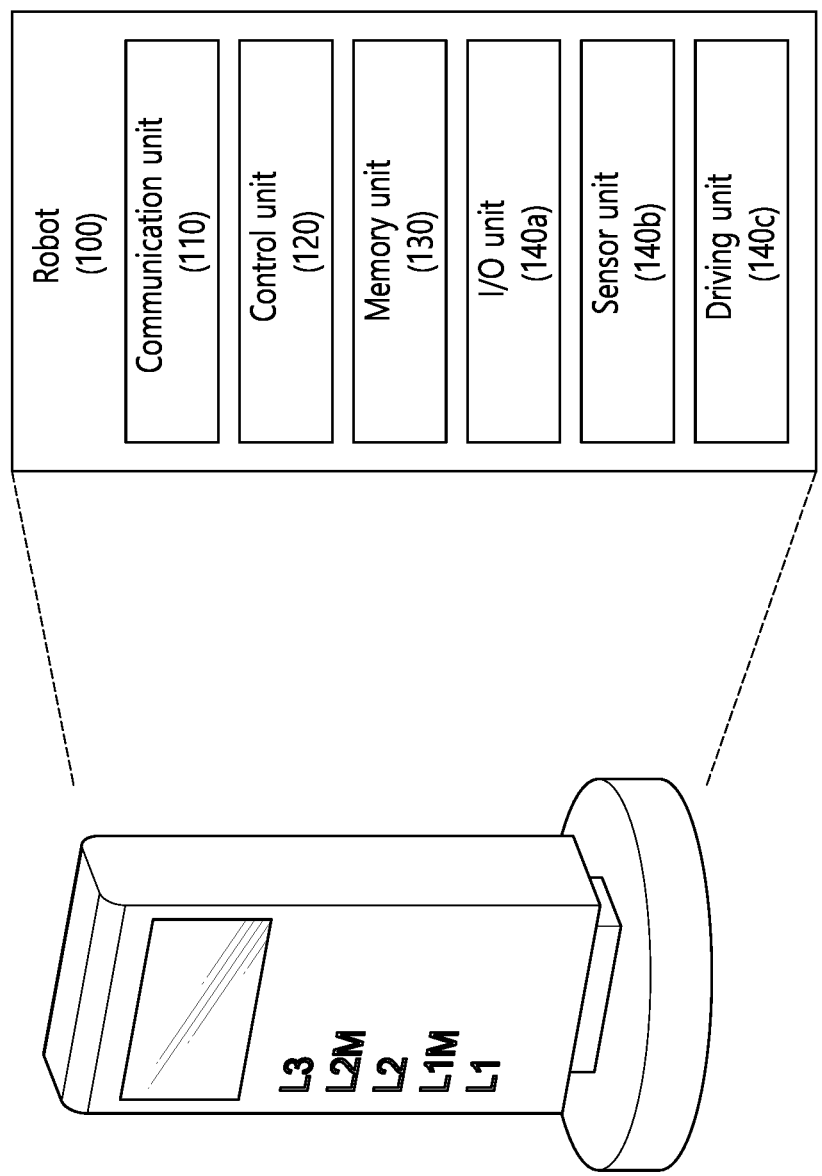
FIG. 27 shows a robot applied to the present disclosure.

FIG. 27 shows a robot applied to the present disclosure. The robot may be categorized into an industrial robot, a medical robot, a household robot, a military robot, and so on, according to a used purpose or field.

Referring to FIG. 27, a robot (100) may include a communication unit (110), a control unit (120), a memory unit (130), an I/O unit (140*a*), a sensor unit (140*b*), and a driving unit (140*c*). Herein, the blocks 110 to 130/140*a*~140*c* correspond to the blocks 110 to 130/140 of FIG. 22, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, and so on. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, and so on.

Figure 28:
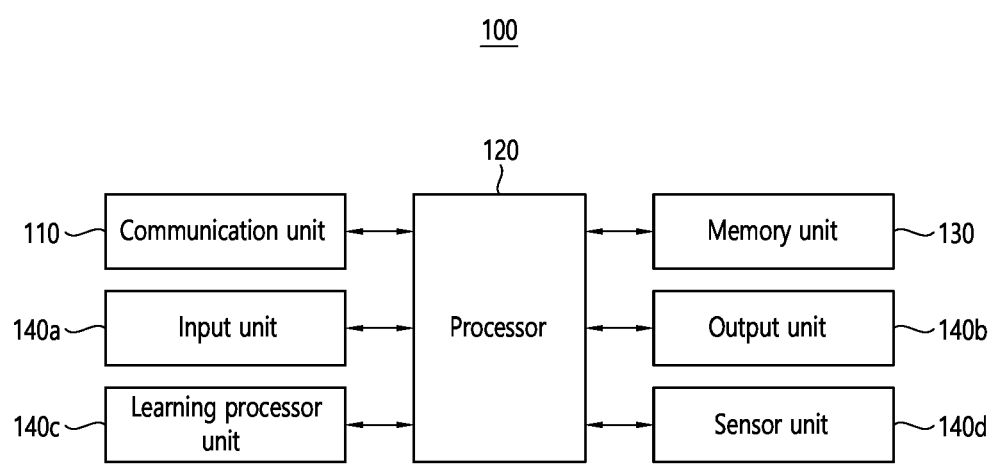
FIG. 28 shows an AI device applied to the present disclosure.

FIG. 28 shows an AI device applied to the present disclosure. The AI device may be implemented by a fixed device or a mobile device, such as a TV, a projector, a smartphone, a PC, a notebook, a digital broadcast terminal (or UE), a tablet PC, a wearable device, a Set Top Box (STB), a radio, a washing machine, a refrigerator, a digital signage, a robot, a vehicle, and so on.

Referring to FIG. 28, an AI device (100) may include a communication unit (110), a control unit (120), a memory unit (130), an I/O unit (140a/140b), a learning processor unit (140c), and a sensor unit (140d). The blocks 110 to 130/140a~140d correspond to blocks 110 to 130/140 of FIG. 22, respectively.

The communication unit (110) may transmit and receive wired/radio signals (e.g., sensor information, user input, learning models, or control signals) to and from external devices such as other AI devices (e.g., 100x, 200, 400 of FIG. 19) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 19). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 19). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for performing sidelink transmission, by a first device, the method comprising:
receiving information on a first resource pool being configured based on a first slot format,
wherein the first slot format includes at least one of a first symbol related to downlink, a first symbol related to uplink, or a first flexible symbol, and
wherein the first resource pool includes a first sidelink (SL) resource for first physical sidelink control channel (PSSCH) transmission and a first SL resource for first physical sidelink shared channel (PSSCH) transmission;
reserving a first resource for the sidelink transmission based on information on the first resource pool;
after reserving the first resource for the sidelink transmission based on the information on the first resource pool, receiving information on a second resource pool being configured based on a second slot format which is different from the first slot format,
wherein the second slot format includes at least one of a second symbol related to downlink, a second symbol related to uplink, or a second flexible symbol, and
wherein the second resource pool includes a second SL resource for second PSCCH transmission and a second SL resource for second PSSCH transmission;
cancelling a third resource, based on the information on the second resource pool being configured based on the second slot format,
wherein the third resource is a resource within the reserved first resource based on the information on the first resource pool, and a resource changed from the first slot format to the second slot format;
reserving a second resource for the sidelink transmission based on information on the second resource pool and information on the third resource; and
performing the sidelink transmission based on the information on the second resource pool.

2. The method of claim 1, wherein the first resource pool and the second resource pool are configured based on a symbol related to sidelink.

3. The method of claim 2, further comprising:
receiving, from a base station, information indicating that a flexible symbol is a resource for the sidelink transmission.

4. The method of claim 1, wherein the first resource pool and the second resource pool are configured based on a symbol related to sidelink and a flexible symbol.

5. The method of claim 1, wherein the sidelink transmission is performed on the second resource.

6. The method of claim 1, wherein the third resource is a resource for the sidelink transmission being adjacent to the first resource on a frequency domain.

7. The method of claim 1, wherein the third resource is a resource for the sidelink transmission being positioned before or after the first resource on a time domain.

8. The method of claim 1, wherein the sidelink transmission is performed on the first resource and the third resource.

9. The method of claim 1, further comprising:
based on the first slot format being changed to the second slot format, transmitting information on the second slot format or information on the second resource pool to a second device, wherein the second device is located outside of a base station coverage.

10. The method of claim 1, wherein information on a slot format of a neighboring base station is transmitted to a base station.

11. The method of claim 10, further comprising:
receiving, from the base station, information on a slot format of the base station and information on a slot format of the neighboring base station.

12. A first device for performing sidelink transmission, comprising:
one or more memories;
one or more transceivers; and
one or more processors being operatively connected to the one or more memories and the one or more transceivers,
wherein the one or more processors is configured to:
control the transceiver to receive information on a first resource pool being configured based on a first slot format,
wherein the first slot format includes at least one of a first symbol related to downlink, a first symbol related to uplink, or a first flexible symbol, and
wherein the first resource pool includes a first sidelink (SL) resource for first physical sidelink control channel (PSSCH) transmission and a first SL resource for first physical sidelink shared channel (PSSCH) transmission;
reserve a first resource for the sidelink transmission based on information on the first resource pool,
after reserving the first resource for the sidelink transmission based on the information on the first resource pool, receive information on a second resource pool being configured based on a second slot format which is different from the first slot format,
wherein the second slot format includes at least one of a second symbol related to downlink, a second symbol related to uplink, or a second flexible symbol, and
wherein the second resource pool includes a second SL resource for second PSCCH transmission and a second SL resource for second PSSCH transmission;
cancelling a third resource, based on the information on the second resource pool being configured based on the second slot format,
wherein the third resource is a resource within the reserved first resource based on the information on the first resource pool, and a resource changed from the first slot format to the second slot format;
reserving a second resource for the sidelink transmission based on information on the second resource pool and information on the third resource; and
perform the sidelink transmission based on the information on the second resource pool.

* * * * *